United States Patent
Seki et al.

(10) Patent No.: US 7,661,687 B2
(45) Date of Patent: Feb. 16, 2010

(54) VEHICLE AND CHAIN PLAY ADJUSTING DEVICE THEREOF

(75) Inventors: Bunzo Seki, Saitama (JP); Shigeto Inami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 278 days.

(21) Appl. No.: 11/086,241

(22) Filed: Mar. 23, 2005

(65) Prior Publication Data

US 2005/0221936 A1  Oct. 6, 2005

(30) Foreign Application Priority Data

Mar. 30, 2004 (JP) ............. P. 2004-101323
Mar. 30, 2004 (JP) ............. P. 2004-101350
Mar. 30, 2004 (JP) ............. P. 2004-101362

(51) Int. Cl.
*B60G 3/18* (2006.01)
(52) U.S. Cl. ............. 280/124.135; 280/124.15; 180/373
(58) Field of Classification Search ........ 180/373, 180/371, 363, 358, 357, 348, 337; 474/144; 280/124.135, 124.141, 124.145, 124.146, 280/124.15, 124.154, 124.157, 124.152, 280/124.158
See application file for complete search history.

(56) References Cited

U.S. PATENT DOCUMENTS

| | | | | |
|---|---|---|---|---|
| 3,193,304 A | * | 7/1965 | Behlke | 280/124.142 |
| 4,810,002 A | * | 3/1989 | Kakimoto et al. | 280/124.138 |
| 4,826,203 A | * | 5/1989 | Kijima et al. | 280/124.109 |
| 4,887,829 A | * | 12/1989 | Prince | 280/282 |
| 5,048,858 A | * | 9/1991 | Luger | 280/124.136 |
| 5,064,016 A | * | 11/1991 | Iwai et al. | 180/215 |
| 5,513,874 A | * | 5/1996 | Mori | 280/93.51 |
| 5,975,226 A | * | 11/1999 | Matsumoto et al. | 180/9.34 |
| 6,076,619 A | * | 6/2000 | Hammer | 180/6.48 |
| 6,105,984 A | * | 8/2000 | Schmitz et al. | 280/124.136 |
| 6,250,415 B1 | * | 6/2001 | Seto | 180/337 |
| 6,286,619 B1 | * | 9/2001 | Uchiyama et al. | 180/337 |
| 6,533,060 B1 | * | 3/2003 | Seto | 180/337 |
| 6,675,926 B2 | * | 1/2004 | Montague | 180/350 |
| 6,695,329 B2 | * | 2/2004 | Handa | 280/124.135 |
| 6,752,408 B2 | * | 6/2004 | La | 280/124.135 |
| 6,837,330 B2 | * | 1/2005 | Suzuki | 180/348 |

(Continued)

FOREIGN PATENT DOCUMENTS

JP    34-14619    9/1959

(Continued)

OTHER PUBLICATIONS

Hammer, Adolph, Mechnanical and Transport Engineer Abstract, 2008 CSA (related Patent U.S.6,076,619).*

*Primary Examiner*—Paul N Dickson
*Assistant Examiner*—Karen Jane J Amores
(74) *Attorney, Agent, or Firm*—Birch, Stewart, Kolasch & Birch, LLP

(57) ABSTRACT

In the rough-terrain traveling vehicle in which rear wheels as left and right wheels are independently suspended via left and right lower arms respectively, and an anti-roll bar device is extended between the left and right lower arms, the left and right rear wheels are driven from an engine side via a chain, and the anti-roll bar device is disposed so as to extend across the inside of the circle of the chain.

16 Claims, 17 Drawing Sheets

U.S. PATENT DOCUMENTS

| | | | |
|---|---|---|---|
| 7,343,997 B1* | 3/2008 | Matthies | 180/215 |
| 2001/0048207 A1* | 12/2001 | Handa | 280/124.135 |
| 2001/0052435 A1* | 12/2001 | Montague | 180/350 |
| 2002/0007978 A1* | 1/2002 | Suzuki | 180/251 |
| 2002/0024192 A1* | 2/2002 | Rasidescu et al. | 280/124.135 |
| 2003/0029665 A1* | 2/2003 | Suzuki | 180/348 |
| 2003/0168827 A1* | 9/2003 | La | 280/124.135 |
| 2003/0217874 A1* | 11/2003 | Schoenberg | 180/2.2 |
| 2004/0051271 A1* | 3/2004 | Dean et al. | 280/124.158 |
| 2005/0167179 A1* | 8/2005 | Hasegawa et al. | 180/348 |
| 2005/0221936 A1* | 10/2005 | Seki et al. | 474/144 |
| 2005/0288151 A1* | 12/2005 | Yamamoto | 477/110 |
| 2006/0000652 A1* | 1/2006 | Yamaguchi et al. | 180/68.3 |
| 2007/0007758 A1* | 1/2007 | Maeda et al. | 280/788 |
| 2007/0066429 A1* | 3/2007 | Seki et al. | 474/112 |
| 2007/0114747 A1* | 5/2007 | Morgan | 280/124.135 |
| 2007/0193812 A1* | 8/2007 | Adachi et al. | 180/309 |
| 2007/0193813 A1* | 8/2007 | Schlangen et al. | 180/312 |
| 2007/0216124 A1* | 9/2007 | Wakabayashi et al. | 280/89 |
| 2007/0240917 A1* | 10/2007 | Duceppe | 180/9.21 |

FOREIGN PATENT DOCUMENTS

| | | |
|---|---|---|
| JP | 53-006204 | 2/1978 |
| JP | 63-090487 A | 4/1988 |
| JP | 2-267016 A | 10/1990 |
| JP | 3-31626 A | 2/1991 |
| JP | 4-063715 A | 2/1992 |
| JP | 5-000617 A | 1/1993 |
| JP | 5-069712 A | 3/1993 |
| JP | 7-023285 Y2 | 5/1995 |
| JP | 7-266819 A | 10/1995 |
| JP | 2000-233786 A | 8/2000 |
| JP | 2001-270485 A | 10/2001 |
| JP | 2001-328410 A | 11/2001 |
| JP | 2002-349281 A | 12/2002 |
| JP | 2003-2028 A | 1/2003 |

* cited by examiner

← FRONT

VEHICLE AND CHAIN PLAY ADJUSTING DEVICE THEREOF

The present application claims foreign priority based on Japanese Patent Application Numbers. P.2004-101323 (filed on Mar. 30, 2004), P.2004-101350 (filed on Mar. 30, 2004) and P.2004-101362 (filed on Mar. 30, 2004), the contents of which are incorporated herein by reference.

BACKGROUND OF THE INVENTION

The present invention relates to a vehicle, and more particularly to a connecting member for connecting left and right suspension arms, a chain play adjusting device and an arrangement structure of cushion units of the vehicle.

As a connecting member in the related art, a stabilizer which extends between left and right lower arms for supporting left and right wheels is known (for example, see JP-A-2001-328410).

FIG. 1 to FIG. 3 in JP-A-2001-328410 will be described below. Reference numerals used here are quoted from JP-A-2001-328410.

A stabilizer 29 is attached to a rear pipe 33 of a vehicle body frame 22 via a bracket 54 so as to be capable of swinging in the vertical direction, and both ends of the stabilizer 29 are connected respectively to a pair of left and right lower arms 27 attached to the rear portions of the vehicle body frame 22 so as to be capable of swinging in the vertical direction.

A final speed reducer 47 is provided at the rear of the vehicle body frame 22.

The final speed reducer 47 is connected to an engine 21 side located at the front via a propeller shaft 49, and is connected to left and right wheels 23, 23 via drive shafts 46 respectively.

The stabilizer 29 is extending widthwise of the vehicle, and the propeller shaft 49 extending in the fore-and-aft direction of the vehicle is disposed above the stabilizer 29. Since the engine 21 side and the final speed reducer 47 are provided on the vehicle body frame 22, they move little in the vertical direction, and hence no problem arises even when the stabilizer 29 is disposed in the vicinity of the propeller shaft 49. However, for example, when a drive force is transmitted from the engine 21 side to the final speed reducer 49 via a chain, the chain goes slack and shakes in the vertical direction, and hence consideration has to be given to the arrangement of the stabilizer 29 so that the stabilizer 29 does not interfere with the chain. When the stabilizer 29 is placed apart from the chain, interference can be avoided. However, the length of the stabilizer 29 increases, and hence the weight may be increased.

Further, in the chain for transmitting a drive force, since a play may be generated with respect to a sprocket due to loosening caused by abrasion or an influence of temperature, a chain play adjusting device for adjusting the play is required.

A known chain play adjusting device in the related art is the one which adjusts the play of the chain by moving a rear wheel hub for supporting a rear axle of the vehicle in the fore-and-aft direction of the vehicle by means of a cam mechanism (for example, see JP-B-03-031626).

FIG. 3 and FIG. 5 in JP-B-03-031626 will be described below. Reference numerals used here are quoted from JP-B-03-031626.

A rear wheel hub 12 is a cylindrical member for rotatably supporting a rear axle 13 via a pair of left and right bearings 14, 14, and left and right rear wheels 2a, 2b are mounted to both ends of the rear axle 13.

A pair of left and right supporting plates 7a, 7b provided at the end of a vehicle body frame are formed with notches 8a, 8b of rectangular shape in side view. The rear wheel hub 12 is arranged in the notches 8a, 8b, and the rear wheel hub 12 is attached to a pair of upper and lower elongated holes 10a, 10b formed on the supporting plates 7a, 7b respectively with bolts 23, 23.

A supporting bolt 29 is extended between the left and right supporting plates 7a, 7b, and chain plates 25, 25 are mounted to the supporting bolt 29 via a collar 27, and by rotating these chain plates 25, 25, the chain plates 25, 25 press the rear wheel hub 12, so as to be capable of moving the rear wheel hub 12 rearwardly of the vehicle.

Since the rear wheel hub 12 has a structure to be mounted to the elongated holes 10a, 10b formed on the supporting plates 7a, 7b so as to be elongated in the fore-and-aft direction with the bolts 23, 23, supporting rigidity for supporting the rear wheel hub 12 against a load in the fore-and-aft direction of the vehicle exerted onto the rear wheel hub 12 is reduced, and in addition, a lot of troubles are required when adjusting a play of the chain.

When the weight of the rear wheel hub 12 or the rear axle 13 is heavy, a large operating force is required for moving the rear wheel hub 12 or the rear axle 13. It is preferable that the required operating force when adjusting the play of the chain is small, if it is possible.

Further, disclosed in JP-A-2003-002028 is a related arrangement structure of cushion units in a vehicle where lower ends of cushion units are mounted to lower arms attached to a vehicle body frame.

FIG. 5 in JP-A-2003-002028 will be described below. Reference numerals used here are quoted from JP-A-2003-002028.

Upper arms 201 and lower arms 202 as suspension arms are mounted at one end of each to a vehicle body frame 200 so as to be capable of swinging in the vertical direction and at the other end of each to a knuckle 203 so as to be capable of swinging in the vertical direction. The knuckle 203 is a member for rotatably supporting a wheel 205 via a hub 204.

Dampers 206 as cushion units are mounted at one end to the vehicle body frame 200 and at the other end to a damper mounting member 209 provided on the lower arms 202.

When performing maintenance work for a suspending device in the vehicle as described above, the vehicle is jacked up, and hence the cushion units are expanded to a maximum extent. At this time, when the damper mounting member 209 overlaps with drive shafts connected to the hub 204 when viewed from the front side, or from the rear side, the mounting direction of the damper 206 to the lower arms 202 is limited, and hence improvement of assembleability and maintenanceability of the damper 206 is desired.

Preferably a crime-prevention structure for preventing ill-intentioned mischief against vehicle-mounted components when the vehicle is empty is provided.

SUMMARY OF THE INVENTION

It is an object of the present invention to avoid interference of the connecting member with the chain and reduce the weight of the connecting member.

Moreover, it is another object of the present invention to improve supporting rigidity of a case and to reduce an operating force when adjusting a chain in a chain play adjusting device.

Moreover, it is another object of the present to improve assembleability and maintenanceability of cushion units and to enhance a crime-prevention property against the cushion units as vehicle-mounted components in an arrangement structure for cushion unit in a vehicle.

In order to achieve the object, in a first aspect, the embodiment of the invention provides a vehicle in which left and right wheels are independently suspended via left and right arm members respectively, and a connecting member is extended between the left and right arm members, the left and right wheels are driven from an engine side via a chain, and the connecting member is disposed so as to extend across the inside of a chain circle.

Since the connecting member is disposed so as to extend across the inside of the chain circle at a position close to the chain according to the embodiment, the connecting member is prevented from interfering with the chain, and the length of the connecting member can be reduced since the connecting member does not get away from the lower arms, in comparison with the case where, for example, the connecting member is disposed so as to extend across the outside of the chain circle and hence is disposed significantly apart from the chain by taking the slack or vertical shaking of the chain into consideration, in which the connecting member is consequently located apart from lower arms, whereby the length of the connecting member may increase.

Further, in a second aspect of the invention, the connecting member is mounted to lower surfaces of the lower arms.

By mounting the connecting member on the lower surfaces of the lower arms, when the left and right wheels are driven by a drive shaft, the connecting member can be attached to and detached from the lower arms easily without being affected by the drive shaft located above the lower arms.

Further, in a third aspect of the invention, the connecting member is connected to the lower arms via link mechanisms.

By connecting the connecting member to the lower arms via the link mechanisms, flexibility of arrangement of the connecting member can be increased by changing the length of the link mechanisms.

Further, in a forth aspect of the invention, the lower arms are respectively composed of two arm members arranged laterally in front and rear with respect to the vehicle body, the link mechanisms are extended downwardly from the position above and between the respective pairs of the arm members, and the distal ends are connected to the lower surfaces of one of the arm members.

By disposing the link mechanism so as to extend downwardly from the position above and between the respective pairs of the arm members, unused spaces between the respective pairs of the arm members can be effectively used.

Further, in a fifth aspect of the invention, lower ends of cushion units for absorbing impact applied to the left and right wheels and preventing the impact from being transmitted to the vehicle body side are mounted to the lower arms.

By mounting the lower ends of the cushion units to the lower arms, the impact applied to the left and right wheels can be absorbed by the cushion units via the lower arms.

Further, in a sixth aspect of the invention, the cushion units are mounted to upper surfaces of cross plates that connect the arm members of the lower arms at the positions in the vicinity of joint portions between the cross plates and one of the arm members.

By mounting the cushion units on the upper surfaces of the cross plates that connect the arm members of the lower arms at the position in the vicinity of the joint portions between the cross plate and one of the arm members, the cushion units can be mounted to the position where strength and rigidity is significantly high.

Moreover, in a seventh aspect, the embodiment of the invention provides a chain play adjusting device including a case movably mounted on the side of a vehicle body, the case supporting a rear drive mechanism for driving left and right rear wheels, and a driven sprocket mounted to the rear drive mechanism, thereby adjusting a play of a chain extending between an engine and a driven sprocket. The case is retained so as to be pivotable about a pivot shaft with respect to the vehicle body, and a rotating cam mechanism for adjusting the amount of pivotal movement is provided at another mounting position of the case with respect to the vehicle body other than the pivot shaft.

Since the case is pivotably retained on the vehicle body and the rotating cam mechanism for adjusting the amount of pivotal movement of the case is provided, the pivot shaft of the case does not move in the fore-and-aft direction, and hence the load in the fore-and-aft direction of the vehicle can be supported reliably by the pivot shaft. Also, by changing the distance from the pivot shaft to the rotating cam mechanism, the operating force for adjusting the play of the chain can be changed.

Further, in a eighth aspect of the invention, the rear drive mechanism is constituted of parts of left and right constant velocity joints provided at ends of a pair of drive shafts for transmitting drive force to left and right wheels, and the driven sprocket and the parts of the left and right constant velocity joints driven by the driven sprocket are accommodated in the case so as to be attachable and detachable, respectively.

Since the driven sprocket and the part of the constant velocity joints are accommodated in the case so as to be attachable and detachable, respectively, the structure of a drive force transmitting unit can be simplified in comparison with, for example, the one in which the driven sprocket is mounted to the rear drive mechanism and the constant velocity joints are connected to the both ends of the rear drive mechanism.

Further, in a ninth aspect of the invention, the pivot shaft is provided at an upper position of the case, another mounting portions of the case other than the upper position are provided at two positions at the front and the rear thereof, and pivotal movement allowing structures are provided on the vehicle body corresponding to the mounting portions at two positions.

Since the case is retained by the vehicle body at three positions, and the pivot shaft is provided at the uppermost position, the case can be stably retained. In addition, when the chain is wound in the fore-and-aft direction, the play of the chain can be adjusted effectively by the pivotal movement of the case.

Further in a tenth aspect of the invention, under frames are provided below the case for supporting the lower side of the case, rear frames extending in a substantially vertical direction are provided rearwardly of the case, the under frames and the rear frames are joined behind the case, a bracket is attached to a joint portion astride the under frame and the rear frame, and the rotating cam mechanism is provided on the bracket.

Since the brackets are provided at the joint portions between the under frames and the rear frames, and the rotating cam mechanisms are provided on the brackets, the case to which the drive force is exerted can be supported by the portion having high strength and rigidity via the rotating cam mechanisms.

Moreover, in a eleventh aspect, the embodiment of the invention provides a vehicle in which lower ends of cushion units are attached to lower arms of a pair of upper arms and lower arms provided on an independent suspension for suspending left and right wheels independently via brackets and the left and right wheels are driven by drive shafts. In the vehicle, mounting portions of the cushion units at the lower end thereof with respect to the lower arms are provided at a position that does not overlap with the drive shafts when viewed from a front side, or from a rear side of the vehicle when the cushion units are expanded to a maximum extent.

Since the mounting portions for the cushion units are located at positions that do not overlap with the drive shafts when viewed from the front side, or from the rear of the vehicle, good maintenanceability including replacement of the cushion units is achieved.

Further, in a twelfth aspect of the invention, the mounting portions at the lower ends of the cushion units with respect to the lower arms are positioned between the upper arms and the drive shafts when viewed from the front or rear of the vehicle when the cushion units are expanded to a maximum extent.

Since the mounting portions of the cushion units are positioned between the upper arms and the drive shafts when viewed from the front side, or from the rear side of the vehicle, when replacing the cushion units from between the upper arms and the drive shafts, mounting bolts and nuts, for example, can be inserted easily.

Further, in a thirteenth aspect of the invention, the mounting portions of the cushion units with respect to a vehicle body are disposed at positions closer to the widthwise center of the vehicle body than positions where the upper arms and the lower arms are connected to the vehicle body, and the cushion units are integrated with reserve tanks.

Since the mounting portions of the cushion units with respect to the vehicle body are disposed at a position closer to the widthwise center of the vehicle body than the position where the upper arms and the lower arms are connected to the vehicle body, the entire length of the cushion units can be increased, and the stroke of the cushion units can further be increased.

In this case, since the cushion units incline significantly, in the case of cushion units which are not provided with a reserve tank for example, a position of the liquid levels of oil in the cushion units vary easily due to shaking of the vehicle body or the like. However, according to the present invention, since the reserve tanks are provided in the cushion units, the cushion unit main bodies are filled with oil entirely, and hence the liquid levels therein are immune from variations.

Further, in a fourteenth aspect of the invention, the mounting portions of the cushion units are mounted by inserting bolts from the front and tightening nuts at the rear ends of the bolts with a tool.

Since the mounting portions of the cushion units are mounted by inserting the bolts from the front and tightening the nuts at the rear ends of the bolts with the tool, the amount of the bolt projecting forward from the mounting portions of the cushion units can further be reduced.

Moreover, according to a fifteenth aspect of the invention, the embodiment of the invention provides a vehicle in which lower ends of a cushion units are attached to lower arms of a pair of upper arms and lower arms provided on an independent suspension for suspending left and right wheels independently via a bracket and the left and right wheels are driven by drive shafts, wherein the mounting portions of the cushion units are located at positions overlapping with the drive shafts when viewed from the front side, or from the rear side of the vehicle in an empty state in which no load is placed on the vehicle and no occupant exists on the vehicle.

Since the mounting portions of the cushion units are located at positions overlapping with the drive shafts when viewed from the front side, or from the rear side of the vehicle when the vehicle is empty, the ill-intentioned mischief such as disconnecting the lower ends of the cushion units can be prevented.

In the first aspect of the invention, since the connecting member is disposed so as to extend across the inside of the chain circle, the connecting member can be placed in the vicinity of the chain. Therefore, interference with the chain can be avoided, and the length of the connecting member can be reduced, whereby the weight of the connecting member can be reduced.

In the second aspect of the invention, by mounting the connecting member on the lower surfaces of the lower arms, when the left and right wheels are driven by drive shafts, the connecting member can be attached to and detached from the lower arms easily without being affected by the drive shafts located above the lower arms, whereby operability can be improved.

In the third aspect of the invention, by connecting the connecting member to the lower arms via the link mechanisms, flexibility of arrangement of the connecting member can be increased by changing the length of the link mechanisms, whereby the connecting member can be disposed at a further suitable position.

In the forth aspect of the invention, by disposing the link mechanisms so as to extend downwardly from the positions above and between the respective pairs of the arm members, unused spaces between the respective pairs of arm members can be effectively used, whereby a downsized compact vehicle is obtained.

In the fifth aspect of the invention, by mounting the lower ends of the cushion units to the lower arms, the impact applied to the left and right wheels can be absorbed by the cushion units via the lower arms.

In the sixth aspect of the invention, by mounting the cushion units on the upper surfaces of the cross plates that connect the arm members of the lower arms at the positions in the vicinity of the joint portions between the cross plates and one of the arm members, the cushion units can be mounted to the positions where strength and rigidity is significantly high, whereby the cushion units can be stably supported.

Moreover, in the seventh aspect of the invention, since the case is pivotably retained on the vehicle boy and the rotating cam mechanism for adjusting the amount of pivotal movement of the case is provided, the pivot shaft of the case does not move in the fore-and-aft direction, and hence the load in the fore-and-aft direction of the vehicle can be supported reliably by the pivot shaft, and supporting rigidity of the case can further be improved. Also, by changing the distance from the pivot shaft to the rotating cam mechanism, the operating force for adjusting the play of the chain can be reduced, whereby the chain play adjusting device suitable for a machine type can be provided.

In the eighth aspect of the invention, since the driven sprocket and the part of the constant velocity joints are accommodated in the case so as to be attachable and detachable, respectively, the structure of the drive force transmitting unit can be simplified, and the case can be downsized, thereby reducing the weight. Therefore, the case and the driven sprocket can be moved with a smaller operating force when adjusting the play of the chain, and hence adjustment of the play of the chain can be performed easily.

In the ninth aspect of the invention, since the case is retained by the vehicle body at three positions, and the pivot shaft is provided at the uppermost position, the case can be further stably retained. In addition, when the chain is wound in the fore-and-aft direction, the play of the chain can be adjusted effectively.

In the tenth aspect of the invention, since the bracket is provided at the joint portion between the under frame and the rear frame, and the rotating cam mechanism is provided on the bracket, the case to which the drive force is exerted can be supported by the portion having high strength and rigidity via the rotating cam mechanism, whereby the case can be supported firmly.

Moreover, in the eleventh aspect of the invention, since the mounting portions for the cushion units are located at positions that do not overlap with the drive shafts when viewed from the front side, or from the rear side of the vehicle, the mounting direction of the cushion unit with respect to the lower arm can hardly be retrained and hence good assembling ease and maintenanceability can be obtained.

In the twelfth aspect of the invention, since the mounting portions of the cushion units are positioned between the upper arms and the drive shafts when viewed from the front side, or from the rear side of the vehicle, when replacing the cushion units from between the upper arms and the drive shafts, mounting bolts and nuts, for example, can be inserted easily, whereby good maintenanceability is achieved.

In the thirteenth aspect of the invention, since the mounting portions of the cushion units with respect to the vehicle body frame is disposed at position closer to the widthwise center of the vehicle body than positions where the upper arms and the lower arms are connected to the vehicle body, the stroke of the cushion units can further be increased, whereby drivability of the vehicle can be enhanced.

In addition, since the reserve tank is provided in the cushion units, the liquid level in the cushion units is immune from variations and hence the performance of the cushion units can be demonstrated to the maximum extent.

In the fourteenth aspect of the invention, since the mounting portions of the cushion units are mounted by inserting bolts from the front and tightening nuts at the rear ends of the bolts with the tool, the amount of the bolts projecting forward from the mounting portions of the cushion units can further be reduced.

In the fifteenth aspect of the invention, since the mounting portions of the cushion units are located at positions overlapping with the drive shafts when viewed from the front side, or from the rear side of the vehicle when the vehicle is empty, the ill-intentioned mischief such as disconnecting the lower ends of the cushion units can be prevented, whereby crime-prevention property can be enhanced.

DESCRIPTION OF THE PREFERRED EMBODIMENTS

Figure 1:
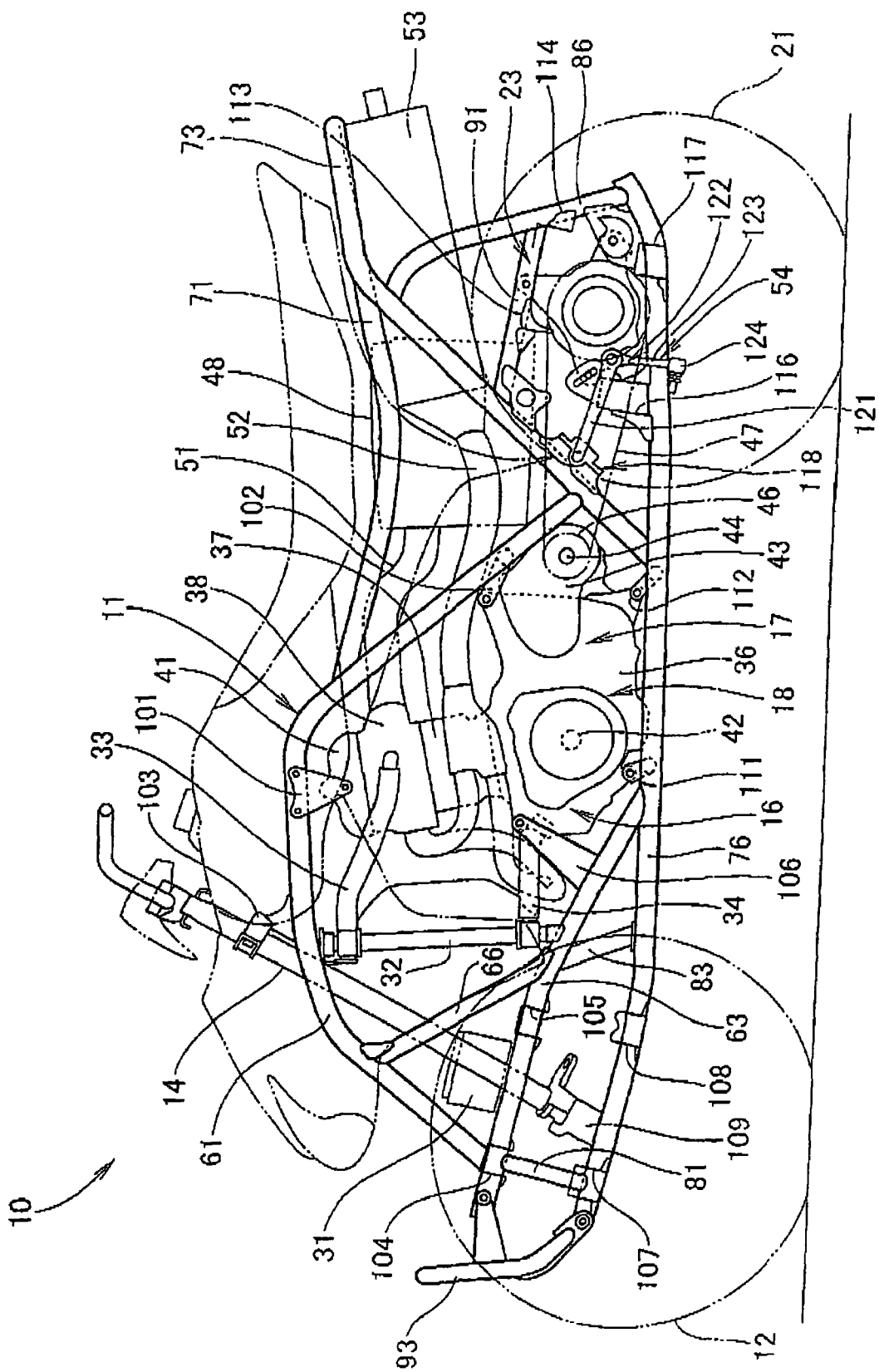
FIG. 1 is a side view of a rough-terrain traveling vehicle according to an embodiment of the invention.

Referring now to the attached drawings, a preferred embodiment will be described below. The drawings are to be viewed in the orientation in which the reference numerals can be viewed in a right way.

FIG. 1 is a side view of a rough-terrain traveling vehicle according to the embodiment. A rough-terrain traveling vehicle 10 is a vehicle including a steering shaft 14 for steering left and right front wheels 12, 13 (only the reference numeral 12 on the near side is shown) mounted to the front portion of a vehicle body frame 11, a power unit 18 including an engine 16 and a transmission 17 mounted to the center portion of the vehicle body frame 11, a drive force transmitting unit 23 for transmitting a drive force to left and right rear wheels 21, 22 (only the reference numeral 21 on the near side is shown) mounted to the rear portion of the vehicle body frame 11.

Reference numeral 31 designates a battery, reference numeral 32 designates a radiator, reference numerals 33, 34 designate a radiator hose connected to the radiator 32 and the engine 16, reference numeral 36 designates a crankcase, reference numeral 37 designates a cylinder block, reference numeral 38 designates a cylinder head, reference numeral 41 designates a head cover, reference numeral 42 designates a crankshaft, reference numeral 43 designates a speed-reducer unit provided on the transmission 17, reference numeral 44 designates an output shaft of the speed-reducer unit 43, reference numeral 46 is a drive sprocket mounted to the output shaft 44, reference numeral 47 designates a chain wound around the drive sprocket 46, reference numeral 48 designates an air cleaner connected to the cylinder head 38 via a connecting tube 51, reference numeral 52 designates an exhaust pipe extending rearward from the cylinder head 38, reference numeral 53 designates a muffler connected to the rear end of the exhaust pipe 52, reference numeral 54 designates an antiroll bar device extending between left and right suspension arms of double-wishbone type independent suspension (more specifically, upper arms and lower arms, not shown) for suspending the left and right rear wheels 21, 22 independently.

The vehicle body frame 11 includes a pair of left and right front upper frames 61, 62 (only reference numeral 61 on the near side is shown) bent into an angular shape, a pair of left and right front middle frames 63, 64 (only the reference numeral 63 on the near side is shown) connected to the front ends of the front upper frames 61, 62, a pair of left and right front first inclined frames 66, 67 (only the reference numeral 66 on the near side is shown) extending so as to be inclined between the midsections of the front middle frames 63, 64 and the front portions of the front upper frames 61, 62, a pair of left and right rear upper frames 71, 72 (only the reference numeral 71 on the near side is shown) extending rearward from the midsections of the front upper frames 61, 62, a pair of left and right rear inclined frames 73, 74 (only the reference numeral 73 on the near side is shown) connected to the rear ends of the front upper frames 61, 62 and to the rear ends of the rear upper frames 71, 72, and a pair of left and right lower frames 76, 77 (only the reference numeral 76 on the near side is shown) extending in the fore-and-aft direction by being connected to the rear ends of the aforementioned front middle frames 63, 64 and the lower ends of the rear inclined frames 73, 74, a pair of left and right front lower first frames 81, 82 (only the reference numeral 81 on the near side is shown) extending between the front portions of the front middle frames 63, 64 and the lower frames 76, 77, a pair of left and right front lower second frames 83, 84 (only the reference numeral 83 on the near side is shown), a pair of left and right rear perpendicular frames 86, 87 (only the reference numeral 56 on the near side is shown) extending substantially perpendicularly between the rear end portions of the lower frames 76, 77 and the rear inclined frames 73, 74, and a pair of left and right rear sub-frames 91, 92 (only the reference numeral 91 on the near side is shown) extending respectively between the rear perpendicular frames 86, 87 and the rear inclined frames 73, 74. Reference numeral 93 designates a front guard member attached to the front ends of the front middle frames 63, 64 and the front ends of the lower frames 76, 77 respectively.

The front upper frames 61, 62 are members each provided with a first bracket 101 and a second bracket 102 for supporting the power unit 18 mounted thereto, and a steering shaft upper portion supporting member 103 for supporting the upper portion of the steering shaft 14.

The front middle frames 63, 64 are members each provided with upper arm supporting portions 104, 105 for mounting upper arms (not shown) for supporting the left front wheel 12 so as to be capable of vertical swinging motion, and a third bracket 106 for supporting the power unit 18.

The lower frames 76, 77 are members each provided with lower arm supporting portions 107, 108 for mounting lower arms (not shown) for supporting the left front wheel 12 respectively so as to be capable of vertical swinging motion at the front portions thereof, a steering shaft lower portion supporting member 109 for supporting the lower portions of the steering shaft 14, and a fourth bracket 111 and a fifth bracket 112 for supporting the power unit 18 at the midsection thereof.

The rear sub-frames 91, 92 are members each provided with upper arm supporting portions 113, 114 for mounting upper arms (not shown) for supporting the left rear wheel 21 so as to be capable of vertical swinging motion.

The lower frames 76, 77 are also members each provided with lower arm supporting portions 116, 117 for mounting lower arms (not shown) for supporting the left rear wheel 21 so as to be capable of vertical swinging motion.

The anti-roll bar device 54, being a device for increasing torsional rigidity by the torsion bar twisted by the difference of stroke between the left and right wheels (in this case, the rear wheels 21, 22) generated when the vehicle body is rolling, includes an anti-roll bar body 121 as a torsion bar attached to the rear inclined frames 73, 74 via bar supporting members 118, 118 (only one of the reference numerals 118 is shown) so as to be capable of vertical swinging motion, and a link mechanism 122 connected to the respective ends of the anti-roll bar body 121, and the distal ends of the respective link mechanism 122 are connected to the left and right lower arms.

The link mechanism 122 includes a bar-shaped link body 123, and ball joints 124, 124 (only one of the reference numeral 124 is shown) provided at both ends of the link body 123.

Figure 2:
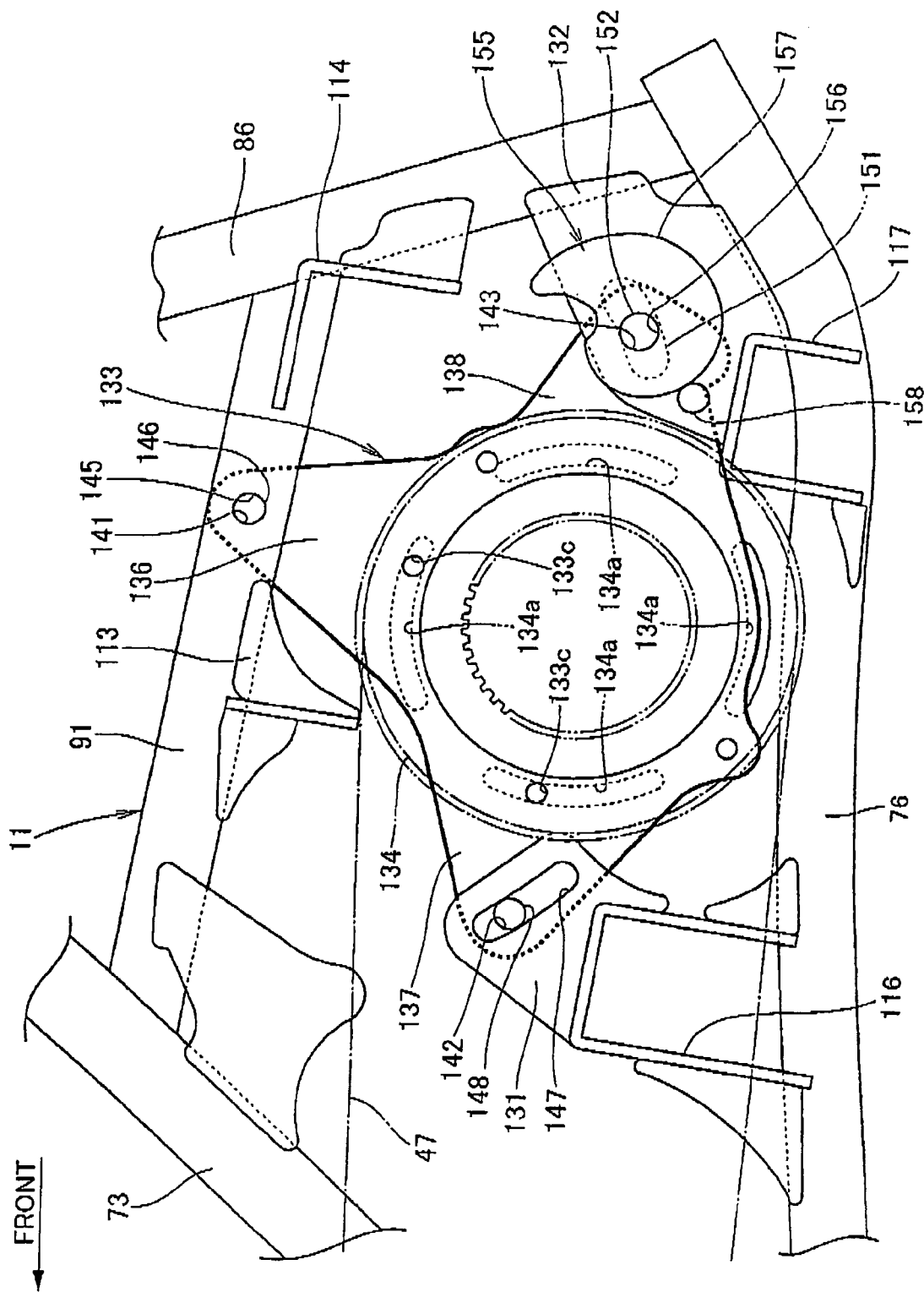
FIG. 2 is a side view showing a principal portion of a drive force transmitting unit according to the embodiment.

FIG. 2 is a side view showing a principal portion of the drive force transmitting unit according to the embodiment (an arrow in the drawing (FRONT) represents the front of the vehicle, hereinafter), showing a state in which a case supporting bracket 131 is attached to the rear wheel lower arm supporting portion 116 for the rear wheel, a case supporting bracket 132 is attached to the rear ends of the lower arm supporting portion 117 for the rear wheel, the rear end of the lower frames 76, 77 (only the reference numeral 76 is shown), and of the rear perpendicular frames 86, 87 (only the reference numeral 86 on the near side is shown), a final gear case 133 (the portion with a thick outline) is supported at three points of the rear sub frames 91, 92 (only the reference numeral 91 on the near side is shown) and the case supporting brackets 131, 132, and the aforementioned chain 47 is wound around a driven sprocket 134 rotatably supported by the final gear case 133.

The final gear case 133 is a member including three arm portions 136-138 and bolt insertion holes 141-143 on the respective arm portions 136-138. The final gear case 133 is mounted to the vehicle body frame 11 by aligning the bolt insertion hole 141 with a mounting hole 145 formed on the rear sub-frames 91, 92, inserting a mounting bolt 146 into the bolt insertion hole 141 and the mounting hole 145, tightening a nut, not shown, onto the distal end of the mounting bolt 146, aligning the bolt insertion hole 142 with an arcuate elongated hole 147 formed on a case supporting bracket 131, inserting the mounting bolt 148 into the bolt insertion hole 142 and the arcuate elongated hole 147, tightening a nut, not shown, onto the distal end of the mounting bolt 148, aligning the bolt insertion hole 143 with an arcuate elongated hole 151 formed on the case supporting bracket 132, inserting a mounting bolt 152 through the bolt insertion hole 143 and the arcuate elongated hole 151, and tightening a nut, not shown, onto the distal end of the mounting bolt 152.

Reference numeral 155 designates a snail cam, which is a member in which the distance from the center of a hole 156 rotatably fitted on the mounting bolt 152 to an outer peripheral surface 157 varies vorticosely, and part of the outer peripheral surface 157 is abutted against a pin 158 mounted to the case supporting bracket 132. Therefore, by loosening screw connection between the mounting bolts 146, 148, 152 with the respective nuts and rotating the snail cam 155, the final gear case 133 can be swung in the fore-and-aft direction about the mounting bolt 146, whereby the driven sprocket 134 can be moved in the fore-and-aft direction to adjust the play of the chain 47.

The final gear case 133 for supporting the driven sprocket 134, the mounting bolt 146 which corresponds to the pivot shaft of the final gear case 133, the snail cam 155, the mounting bolt 152 which corresponds to the revolving shaft of the snail cam 155, and the pin 158 to which the outer peripheral surface 157 of the snail cam 155 is abutted shown above constitute the chain play adjusting device 159.

The snail cam 155 and the pin 158 constitute a rotating cam mechanism 160.

Figure 3:
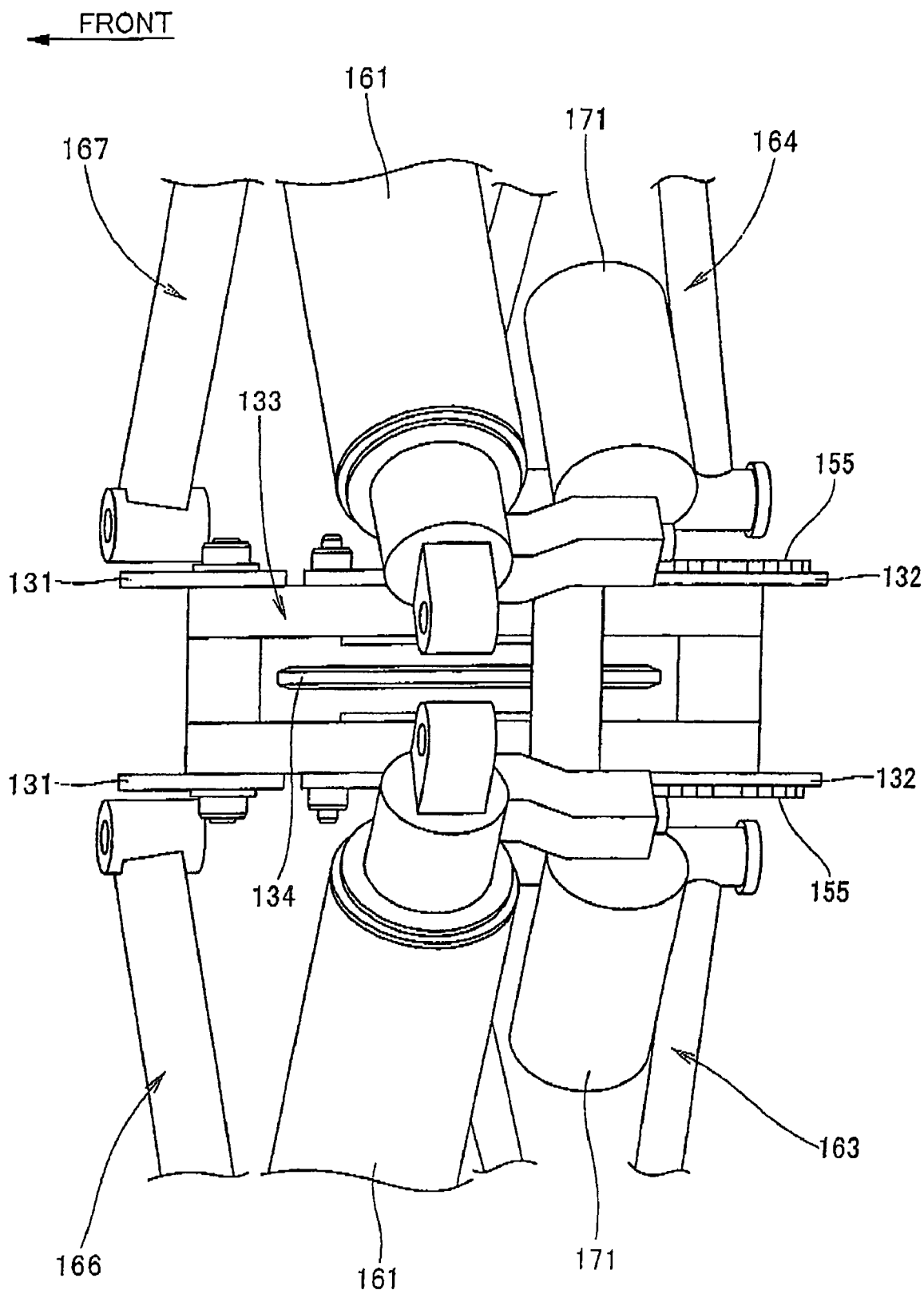
FIG. 3 is a plan view of a principal portion showing a rear portion of a vehicle according to the embodiment.

FIG. 3 is a plan view of a principal portion showing the rear portion of the vehicle according to the embodiment, showing that the front portion of the final gear case 133 is attached to the left and right case supporting brackets 131, 131, and the rear portion of the final gear case 133 is mounted to the left and right case supporting brackets 132, 132, and that the snail cam 155 is disposed on the outsides of the case supporting brackets 132, 132, respectively, and the driven sprocket 134 is disposed in the final gear case 133. Reference numerals 161, 161 designate rear cushion units which are attached at the upper end portions to the vehicle body frame 11 (see FIG. 1), and at the lower end portions to the lower arm. Reference numerals 163, 164 designate upper arms for the rear wheels and reference numerals 166, 167 designate lower arms for rear wheels.

The rear cushion units 161 are integrally provided with reserve tanks 171 having oil therein, which come in and out from cylinders stored therein.

Figure 4:
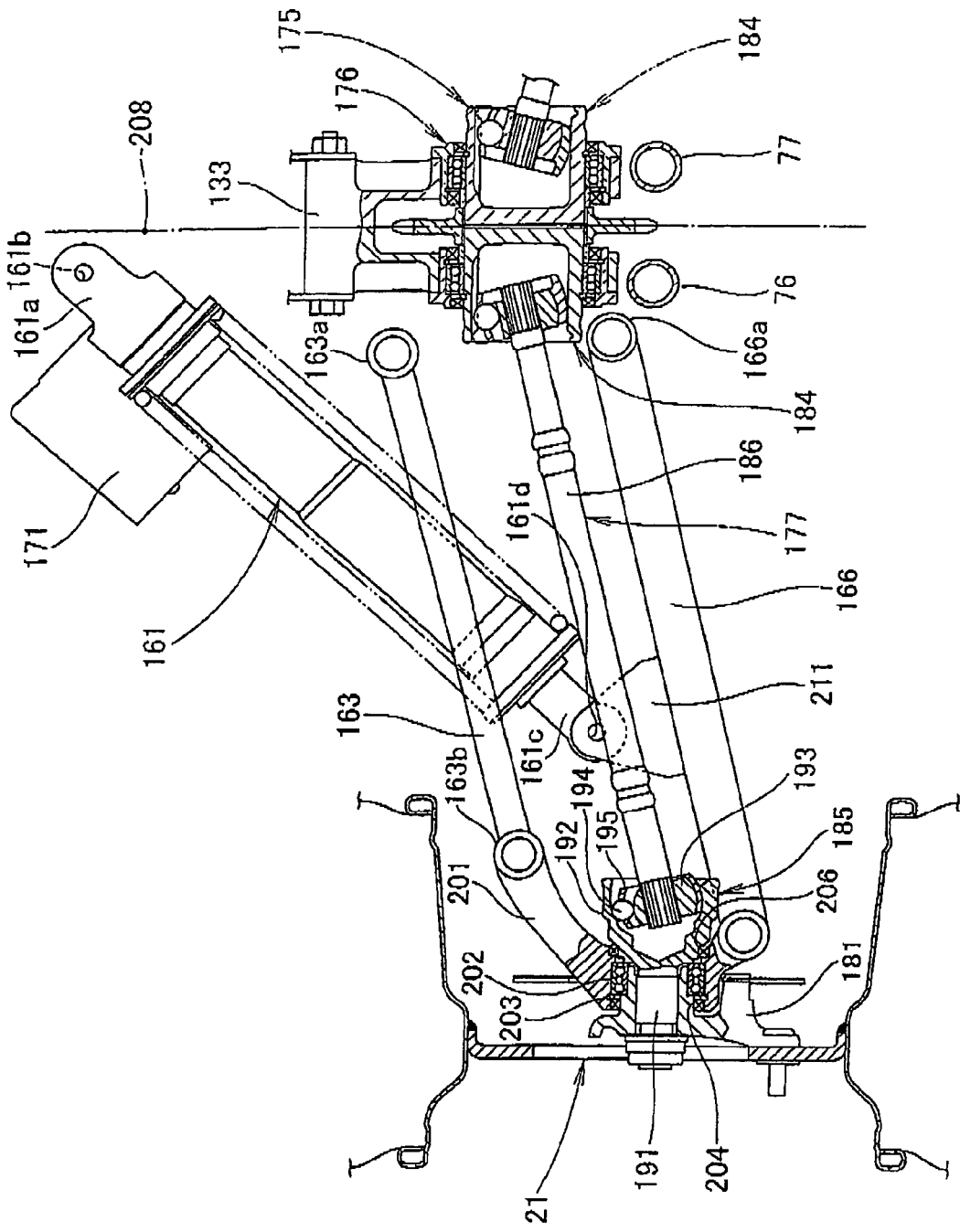
FIG. 4 is a back view showing the drive force transmitting unit of the vehicle according to the embodiment.

FIG. 4 is a back view (partly in cross-section) showing the drive force transmitting unit according to the embodiment.

A drive force transmitting unit 175 includes the aforementioned drive sprocket 46 (see FIG. 1), the chain 47, the final gear case 133, a bearing unit 176 supported by the final gear case 133, left and right drive shafts 177, 178 (only one of the reference numerals 178 is shown) supported at one end by the bearing unit 176, and hubs 181, 182 (only one of the reference numerals 181 is shown) connected to the distal ends of the drive shafts 177, 178. The rear wheels 21, 22 (only one of the reference numerals 21 is shown) are mounted to hubs 181, 182.

The drive shaft 177 is a sliding-type constant velocity joint 184, which is connected to the bearing unit 176, and is swingable and expandable in the axial direction, a fixed-type constant velocity joint 185 which is connected to the hub 181 and is swingable, and a shaft 186 provided between these constant velocity joints 184, 185. The drive shaft 178 has the same structure as the drive shaft 177, and hence the description will be omitted. The constant velocity joint 184 will be described later.

The constant velocity joint 185 includes an outer ring 192 formed integrally with an axle 191 of the rear wheel 21, an inner ring 193 spline-fitted to one end of the shaft 186, a plurality of balls 194 movably disposed in a plurality of ball grooves provided on the inner peripheral surface of the outer ring 192 and on the outer peripheral surface of the inner ring 193, and a cage 195 for retaining the balls 194.

Reference numeral 201 in the drawing designates a knuckle arm connected to the distal ends of the upper arms 163, 164 (only one of the reference numerals 163 is shown) and the lower arms 166, 167 (only one of the reference numerals 166 is shown) for rotatably supporting the constant velocity joint 185 via a bearing 202. Reference numeral 203 designates a retaining ring for fixing the bearing 202, and reference numerals 204, 206 are sealing members.

The rear cushion units 161 are a member whereof one mounting portion 161a, more specifically, a mounting hole 161b to be mounted to the vehicle body frame 11 (see FIG. 1) is disposed at a position closer to a center of the vehicle (a vertical line 208 represents the widthwise center of the vehicle) than mounting portions 163a, 166a of the upper arm 163 and the lower arm 166 to be mounted to the vehicle body frame 11.

In this manner, the reason why the mounting holes 161b of the rear cushion units 161 are disposed at positions closer to the center of the vehicle than the mounting portions 163a, 166a of the upper arms 163 and the lower arms 166 is to increase the entire length of the cushion units 161 and secure a large amount of stroke of the cushion units 161.

At this time, the cushion units 161 incline significantly, since the cushion units 161 are provided with the reserve tanks 171, the cushion units 161 are filled with oil. Therefore, the liquid levels of oil do not exist in the cushion units 161 but in the reserve tank 171. For example, in the cushion units which are not provided with the reserve tanks, the position of the liquid levels of oil in the cushion units vary easily due to the temperature or shaking of the vehicle body, while according to the present invention, the liquid level in the cushion units 161 is immune from variations.

The lower arms 166, 167 are members provided with cushion mounting brackets 211, 211 (only one of the reference numerals 211 is shown) on the upper portions thereof for mounting the other mounting portions 161c of the rear cushion units 161.

The positions of the upper arm 163 and the lower arm 166 in the drawing are in a state in which the rear wheels 21, 22 are in contact with the ground and the operator is not on the vehicle. This state is referred to as an empty state.

In such an empty state, the mounting portions 161c, more specifically, mounting holes 161d of the rear cushion units 161 overlap with the shaft 186 of the drive shafts 177.

Figure 5:
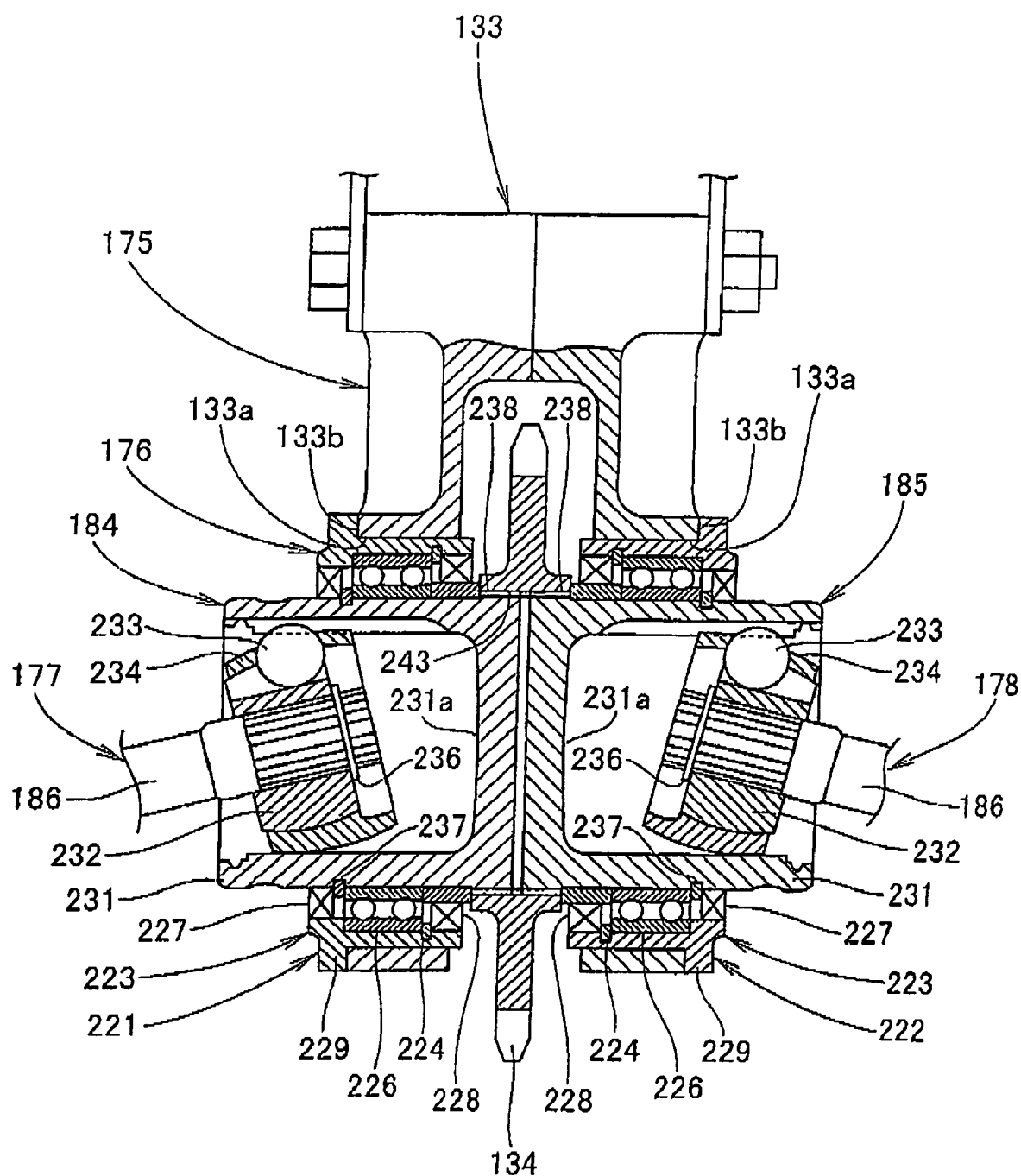
FIG. 5 is a cross-sectional view of a principal portion of the drive force transmitting unit of the vehicle according to the embodiment.

FIG. 5 is a cross-sectional view of a principal portion of the drive force transmitting unit of the vehicle according to the embodiment. The bearing unit 176 of the drive force transmitting unit 175 includes a left bearing element 221 and a right bearing element 222. The left baring element 221 and the right bearing element 222 are symmetry and are the same in basic structure. Therefore, only the left bearing element 221 will be described below.

The left bearing element 221 includes a cylindrical member 223 detachably inserted into a fitting hole 133a of the final gear case 133 divided into left and right halves, a bearing 226 fitted on the inner peripheral surface of the cylindrical 1 member 223 and prevented from coming apart by a retaining ring 224, and sealing members 227, 228 interposed between the cylindrical member 223 and the constant velocity joint 184.

The cylindrical member 223 is a member provided with a flange 229 at an end, and the flange 229 is abutted against a side surface 133b of the final gear case 133 and is mounted to the side surface 133b of the final gear case 133 with a bolt (not shown).

The constant velocity joint 184 includes a housing 231 which corresponds to an outer ring, an inner ring 232 spline-fitted to the other end of the shaft 186, a plurality of balls 233 movably disposed in a plurality of ball grooves provided on the inner peripheral surface of the housing 231 and a plurality of ball grooves provided on the outer peripheral surface of the inner ring 232, and a cage 234 for retaining these balls 233. Reference numeral 236 is a retaining ring for preventing the inner ring 232 from coming off from the shaft 186.

The housing 231 is a member of bottomed cylindrical shape being fitted on an outer peripheral surface thereof to the bearing 226 of the left bearing element 221, being prevented from coming apart from the bearing 226 by a retaining ring 237, and being formed with a male spline 238 at the end of the outer peripheral surface. Reference numeral 231a is a bottom surface of the housing 231.

In a state in which the left and right cylindrical members 223, 223 are mounted to the final gear case 133, the left and right housings 231, 231 are positioned close to each other, and a female spline 243 of the driven sprocket 134 can be spline-fitted to the respective male splines 238 of the housings 231, 231.

Figure 6:
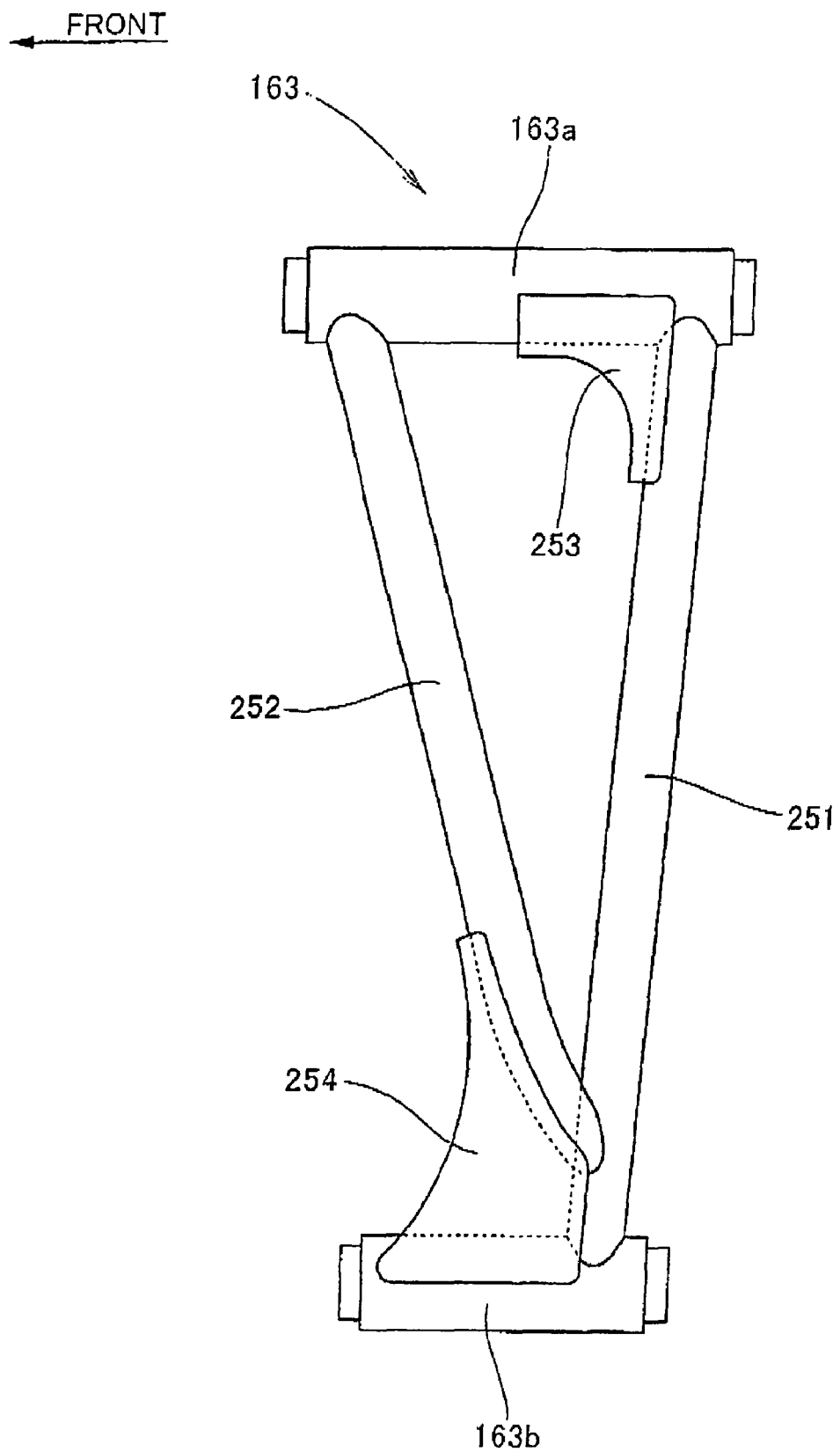
FIG. 6 is a plan view of an upper arm of the vehicle according to the embodiment.

FIG. 6 is a plan view of the upper arm of the vehicle according to the embodiment. The upper arm 163 includes the mounting portion 163a to the vehicle body frame 11 (see FIG. 1) side, an upper first arm 251 extending from the mounting portion 163a substantially at a right angle to the axis thereof, mounting portion 163b mounted to the distal end of the upper first arm 251 for connecting the knuckle arm 201 (see FIG. 4), an upper second arm 252 mounted so as to extend from the mounting portion 163a toward the position in the vicinity of the distal end of the upper first arm 251, a reinforcing member 253 mounted to the mounting portion 163a and the upper first arm 251, and a reinforcing member 254 mounted to the upper first arm 251, the mounting portion 163b, and the upper second arm 252. The upper arm 164 and the upper arm 163 are symmetrical and the same in basic structure. Therefore, detailed description is omitted.

Figure 7:
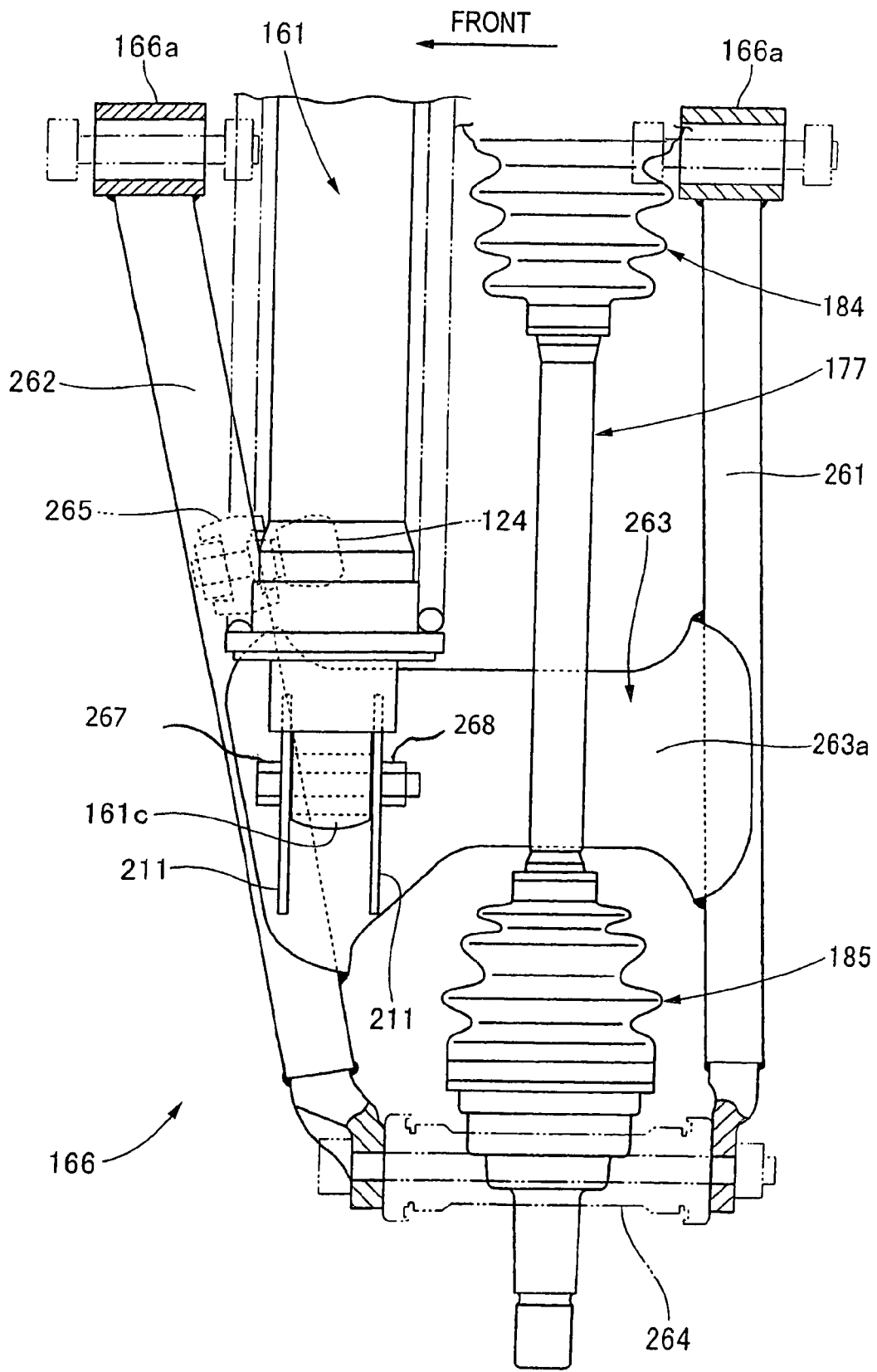
FIG. 7 is a plan view of a lower arm of the vehicle according to the embodiment.

FIG. 7 is a plan view of the lower arm of the vehicle according to the embodiment. The lower arm 166 includes mounting portions 166a, 166a with respect to the vehicle body frames 11 (see FIG. 1) side, a lower first arm 261 extending from one of the mounting portions 166a substantially at a right angle with respect to the axis thereof, a lower second arm 262 extending so as to incline from the other mounting portions 166a in such a manner that the distal end thereof approaches toward the lower first arm 261 with respect to the direction at a right angle with respect to the axis of the mounting portions 166a, a cross plate 263 (a connecting member 263) extending between the lower first arm 261 and the lower second arm 262, and mounting portion 264 extending between the respective ends of the lower first arm 261 and the lower second arm 262.

The cross plate 263 is a member including cushion mounting brackets 211, 211 provided on an upper surface 263a so as to extend in parallel and in the direction of the width of the vehicle at a position in the vicinity of the lower second arm 262.

Reference numeral 265 designates a ball joint mounting unit mounted to the lower portion of the lower second arm 262 so as to connect the ball joint 124 of the anti-roll bar device 54 (see FIG. 1).

Reference numerals 267, 268 designate mounting bolts and nuts for mounting the mounting portions 161c of the rear cushion units 161 to the cushion mounting brackets 211, 211.

Figure 8A:
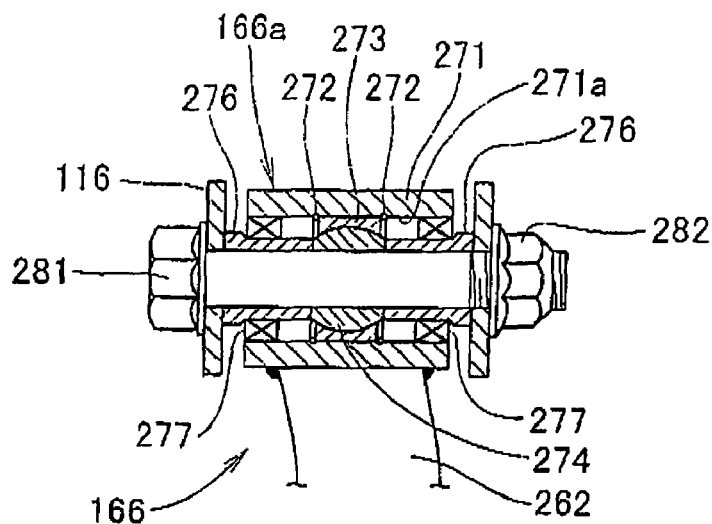
FIG. 8A is a cross-sectional view showing a principal portion of the upper arm.
Figure 8B:
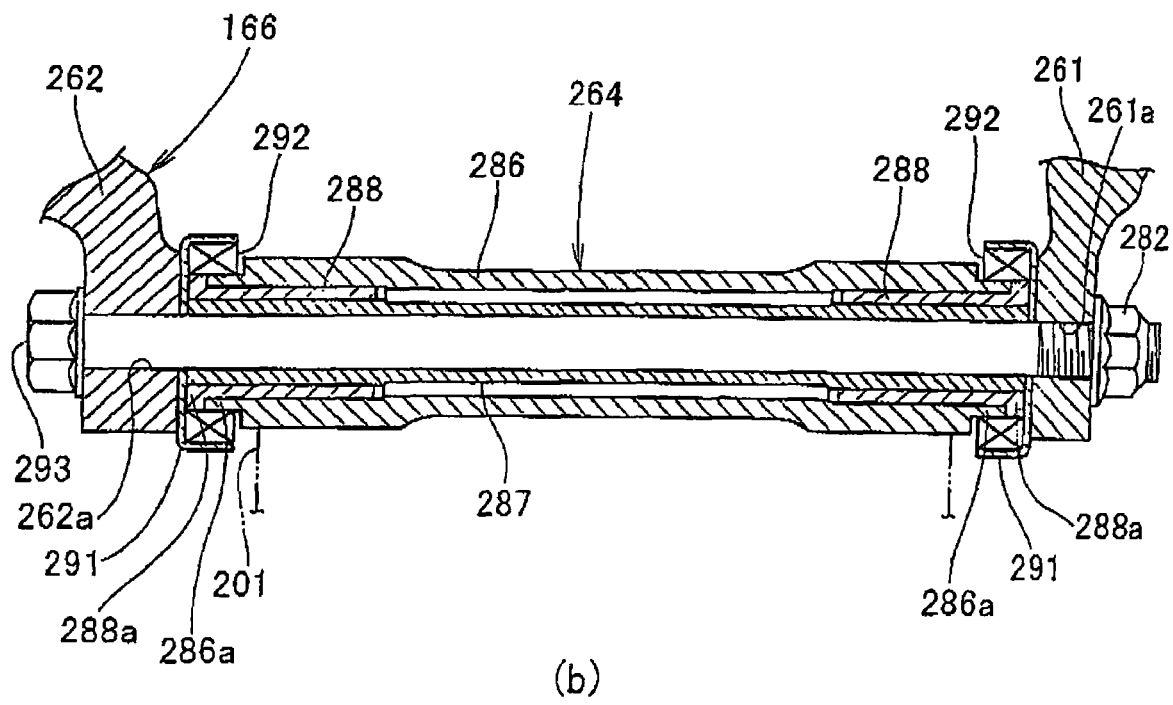
FIG. 8B is a cross-sectional view showing a principal portion of the lower arm.

FIG. 8A and FIG. 8B are cross-sectional views showing a principal portion of the upper arm and the lower arm of the vehicle according to the embodiment.

FIG. 8A shows the mounting portion 166a of the lower arm 166 with respect to the vehicle body frame 11 (see FIG. 1) side.

The mounting portion 166a includes a cylindrical member 271 attached to the end of the lower second arm 262, an outer ring 273 fixed to an inner peripheral surface 271a of the cylindrical member 271 by retaining rings 272, 272, an inner ring 274 fitted to the outer ring 273 in such a manner that the projecting spherical surface is slidably fitted to the recessed spherical surface provided on the outer ring 273, collars 276, 276 fitted to both ends of the inner ring 274, and sealing members 277, 277 interposed between the respective collars 276, 276 and the cylindrical member 271, respectively. A mounting bolt 281 is inserted into the lower arm supporting portion 116, the collar 276, the inner ring 274, the collar 276, and the lower arm supporting portion 116 in sequence from the front of the vehicle, and a nut 282 is screwed into the distal end of the mounting bolt 281, whereby the lower arm 166 is mounted to the lower arm supporting portion 116.

FIG. 8B shows mounting portions 264 of the lower arm 166 with respect to the knuckle arm 201 (see FIG. 4 as well) side.

The mounting portions 264 include an outer cylindrical member 286 mounted to the knuckle arm 201, an inner cylindrical member 287 disposed inside the outer cylindrical member 286, bushes 288, 288 interposed between the outer cylindrical member 286 and the inner cylindrical member 287 at the ends thereof, substantially cup-shaped end receiving members 291, 291 abutted against the respective end surfaces of the inner cylindrical member 287 and the bushes 288, and sealing members 292 for sealing the ends of the mounting portion 264 by being abutted against the small-diameter portions 286a of the outer cylindrical member 286, the flanges 288a of the bushes 288, and the inner peripheral surfaces of the end receiving members 291, and the mounting bolt 293 is inserted into a through hole 262a formed through the lower second arm 262, the end receiving member 291, the inner cylindrical member 287, the end receiving member 291, and a through hole 261a formed through the lower first arm 261 in sequence from the front of the vehicle, and the nut 282 is screwed onto the distal end of the mounting bolt 293, whereby the knuckle arm 201 is mounted to the lower first arm 261 and the lower second arm 262.

Figure 9:
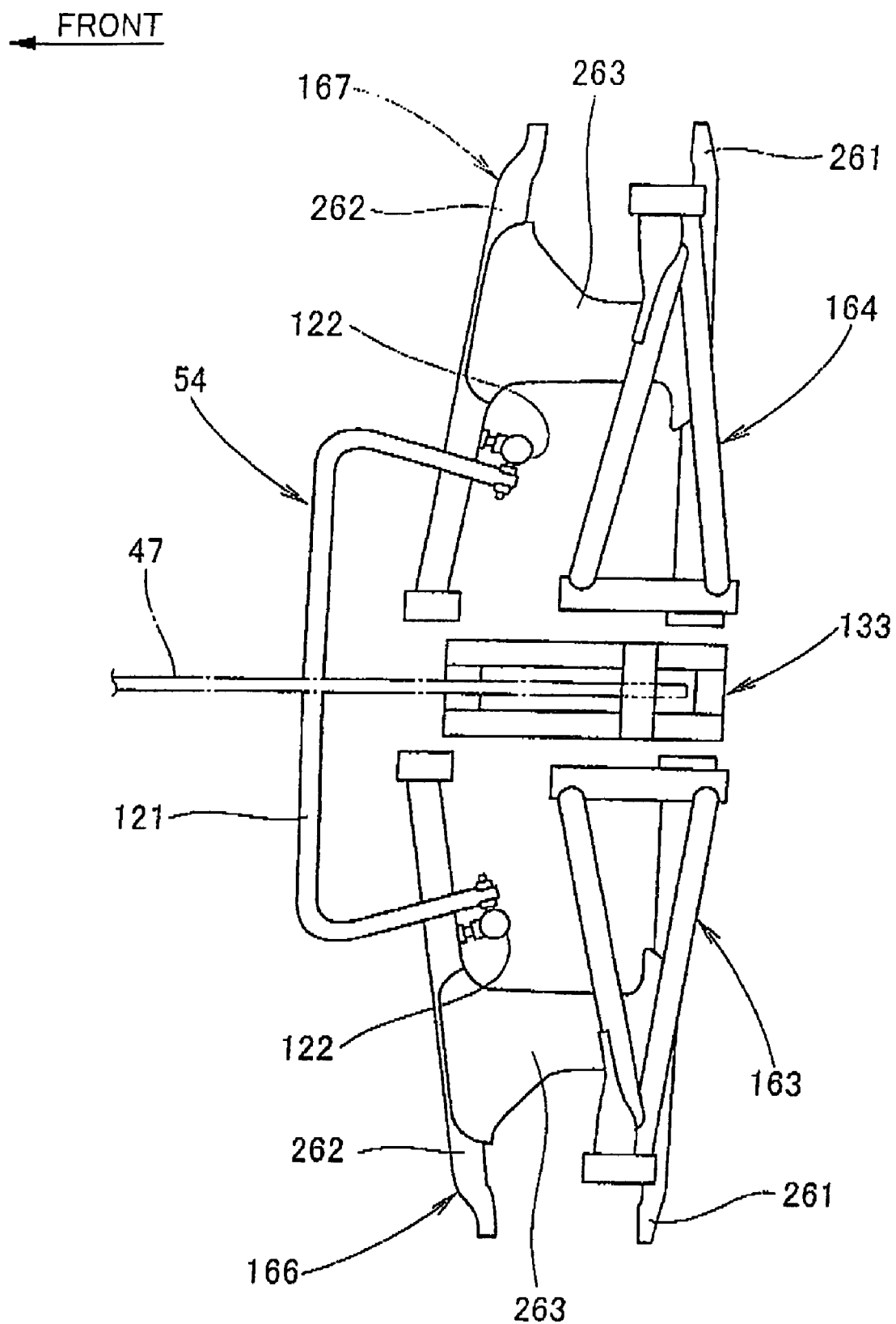
FIG. 9 is plan view showing a connecting member according to the embodiment.

FIG. 9 is a plan view showing the connecting member according to the embodiment showing that a substantially angular C-shaped anti-roll bar body 121 of the anti-roll bar device 54 is extended widthwise of the vehicle through the inside of the chain 47, and link mechanisms 122, 122 are connected to both ends of the anti-roll bar body 121, and the distal ends of the link mechanisms 122, 122 are connected to the left and right lower arms 166, 167.

Figure 10:
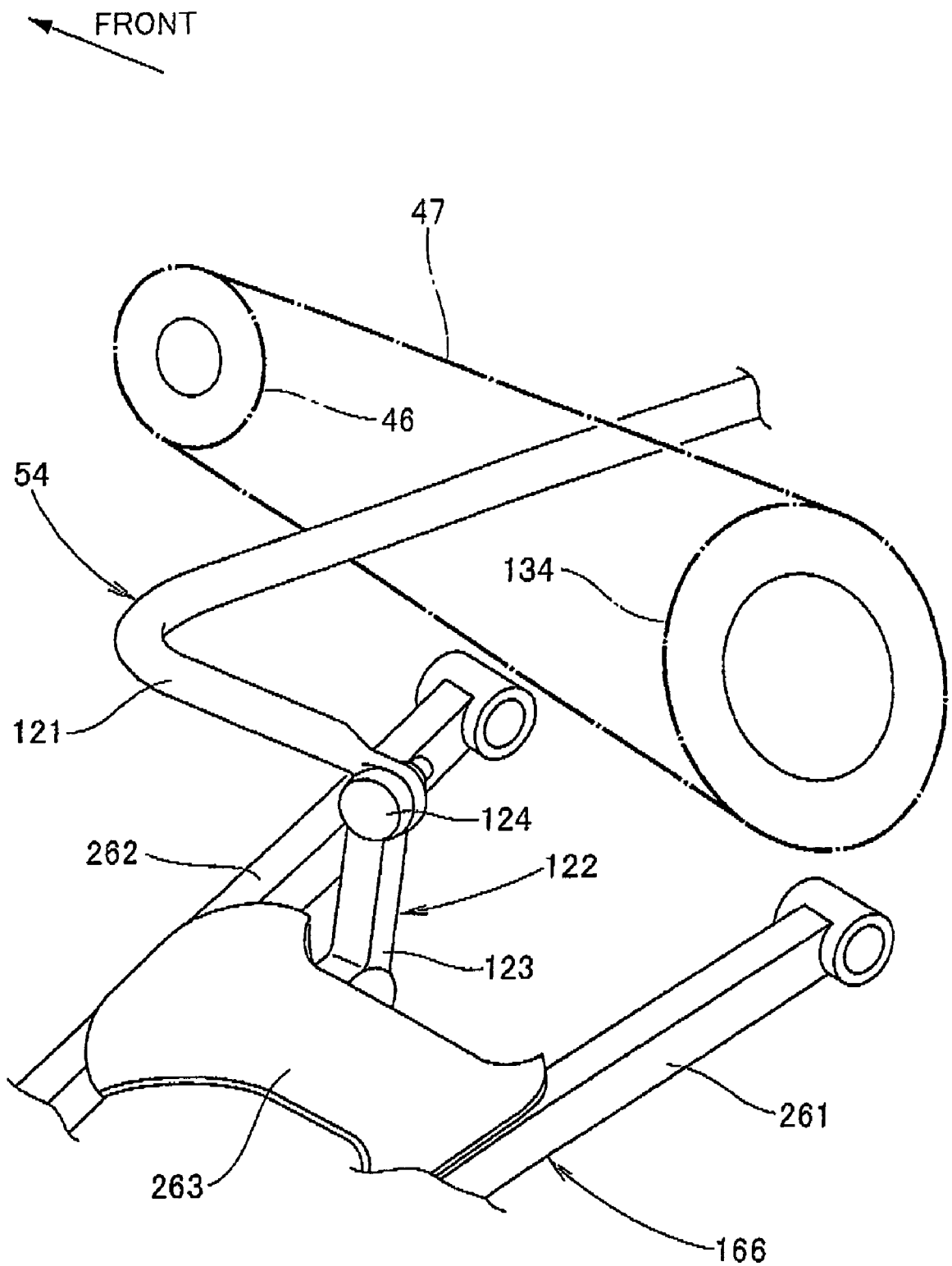
FIG. 10 is a perspective view showing the connecting member according to the embodiment.

FIG. 10 is a perspective view showing an anti-roll bar device according to the embodiment showing that the anti-roll bar body 121 which constitutes the anti-roll bar device 54 is disposed so as to extend across the inside of the circle of the chain 47, and the link mechanisms 122, 122 (only one of the reference numerals 122 is shown) connected to the ends of the anti-roll bar body 121 are extended substantially vertically in spaces defined by the lower first arms 261, the lower second arms 262 of the lower arms 166, 167 (only one of the reference numerals 166 is shown), and the cross plates 263 and connected to the lower surfaces of the lower arms 166, 167.

Figure 11:
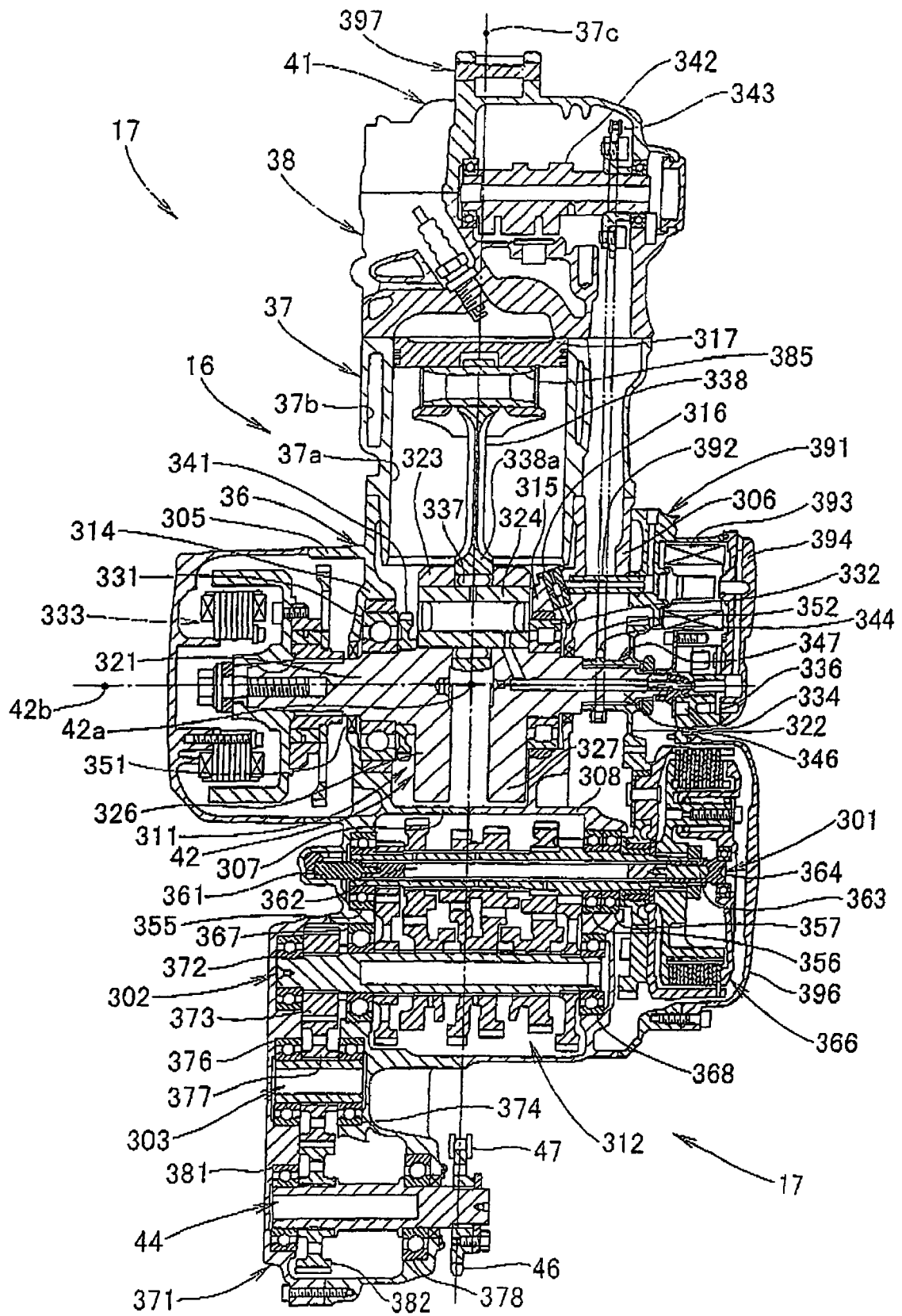
FIG. 11 is a cross-sectional view of a power unit of a vehicle according to the embodiment.

FIG. 11 is a cross-sectional view of the power unit of the vehicle according to the embodiment. The engine 16 provided in front of the power unit 17 includes the crankcase 36, the cylinder block 37, the cylinder head 38, and the head cover 41, and the crankcase 36 is configured by rotatably accommodating the crankshaft 42, and a main shaft 301, a counter shaft 302, an intermediate shaft 303, and the output shaft 44 disposed behind the crankshaft 42 on the side of the transmission 17, fitting a left crankcase 305 and a right crankcase 306 together, and separating the interior thereof into a closed crank chamber 311 and a transmission chamber 312 by partition walls 307, 308.

The left crankcase 305 includes a first main bearing unit 314 for mounting the crankshaft 42, and the right crankcase 306 includes a second main bearing unit 315 for mounting the crankshaft 42, and an oil jet nozzle 316 for cooling a piston, described later, to the second main bearing unit 315 on the side of the cylinder block 37.

The cylinder block 37 employs a water-cooled system in which a piston 317 is movable inserted into a cylinder member 37a for flowing cooling water to a water jacket 37b. Reference numeral 37c designates a cylinder shaft of the cylinder member 37a.

The crankshaft 42 includes first and second shaft portions 321, 322, a crank portion 323 that connects the first and second shaft portions 321, 322, a crankpin 324 mounted to the crank portion 323, and counter weights 326, 327 provided on the first and second shaft portions 321, 322 on the opposite side from the crank portion 323 with respect to the axis center of the first and second shaft portions 321, 322.

The crankshaft 42 is a member which is mounted rotatably to the left crankcase 305 via a radial ball bearing 331 and to the right crankcase 306 via a radial roll bearing 332, and includes an AC generator 333 for generating electricity at one end, a first oil pump 334 and a second oil pump 336 for dry sump lubrication at the other end, a connecting rod 338 rotatably mounted at its large end 338a to the crankpin 324 via a bearing 337, a balancer shaft drive gear 341 for driving a balancer shaft (not shown) fitted to the first shaft portion 321, and a gear member 347 including a cam shaft drive gear 344 for driving a cam shaft 342 via a chain 343 and a main shaft drive gear 346 for driving the main shaft 301 on the side of the transmission 17, the gear member 347 being mounted to the second shaft portion 322. Reference numerals 351, 352 designate oil seals for preventing leakage of oil from the crank chamber 311.

The main shaft 301 is a member which is rotatably mounted to the left crankcase 305 via a baring 355 and to the right crankcase 306 via bearings 356, 357, and which accommodates therein a first rod 361, a second rod 362, a third rod 363, and a fourth rod 364 so as to be capable of moving in the axial direction, and includes a crutch 366 spline-fitted on the outer periphery at the end thereof, and a plurality of drive gears spline-fitted to the outer periphery thereof so as to be movable in the axial direction.

The first rod 361, the second rod 362, the third rod 363, and the fourth rod 364 are members for controlling transmission of drive force from the crankshaft 42 to the main shaft 301 by connecting and disconnecting the clutch 366 by being moved in the axial direction.

The countershaft 302 is a member which is rotatably attached to the left crankcase 305 via a bearing 367, to the right crankcase 306 via a bearing 368, and to a left case cover 371 via a bearing 372, and which is provided with a plurality of driven gears to be engaged with the drive gear of the main shaft 301, a plurality of the driven gears being spline-fitted to the outer periphery of the counter shaft 302 so as to be movable in the axial direction, and a first gear 373 attached to the end thereof.

The intermediate shaft 303 is a member which is rotatably mounted to the left crankcase 305 via a bearing 374 and to the left case cover 371 via a bearing 376, and which is provided with a second gear 377 to be engaged with the first gear 373 mounted thereto.

The output shaft 44 is a member which is rotatably mounted to the left crankcase 305 via a bearing 378 and to the left case cover 371 via a bearing 381, and which is provided with a third gear 382 to be engaged with the second gear 377 and the drive sprocket 46 for driving the rear wheels 21, 22 (see FIG. 1) via the chain 47 at the end thereof.

The piston 317 is rotatably mounted to a small end portion 338b of the connecting rod 338 via a piston pin 385.

Reference numeral 391 here designates a case side cover mounted on the side of the right crankcase 306, reference numeral 392 designates a connecting pipe for connecting the case side cover 391 and the second main bearing unit 315 of the right crankcase 306, reference numeral 393 designates an oil filter, reference numeral 394 designates an oil filter cover, reference numeral 396 designates a cover for covering the outside of the clutch 366, and reference numeral 397 designates mounting portions for mounting the engine 16 to a vehicle body frame, not shown.

Figure 12:
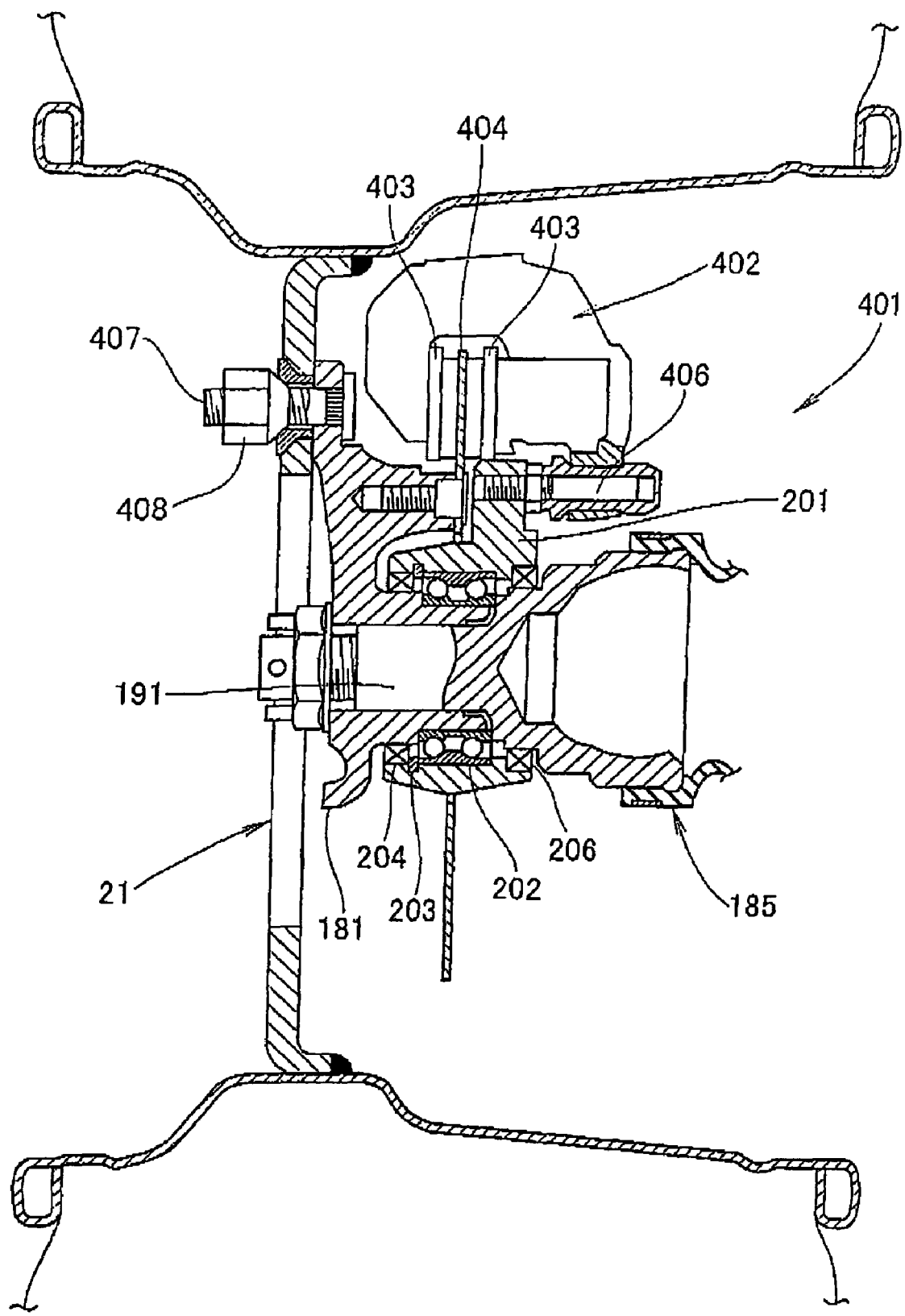
FIG. 12 is a cross-sectional view showing a disk brake device of the vehicle according to the embodiment.

FIG. 12 is a cross-sectional view showing a disk brake device of the vehicle according to the embodiment. A disk brake device 401 includes a brake caliper 402 mounted to the knuckle arm 201, and a brake disk 404 which is clamped between two brake pads 403, 403 by operating a piston (not shown) accommodated in the brake caliper 402 so as to be movable in the by oil pressure.

The brake caliper 402 is mounted to a bolt 406 screwed onto the knuckle arm 201 so as to be capable of moving in the orthogonal to the sliding surface of the brake disk 404. The brake disk 404 is mounted to a hub 181. Reference numeral 407 designates a mounting bolt fixed to the hub 181 for mounting the rear wheel 21 to the hub 181, and reference numeral 408 designates a tapered wheel nut connected to the mounting bolt 407 with a screw.

The attaching and detaching operation of the driven sprocket 134 described thus far will be described in conjunction with FIGS. 13 to 15.

Figure 13:
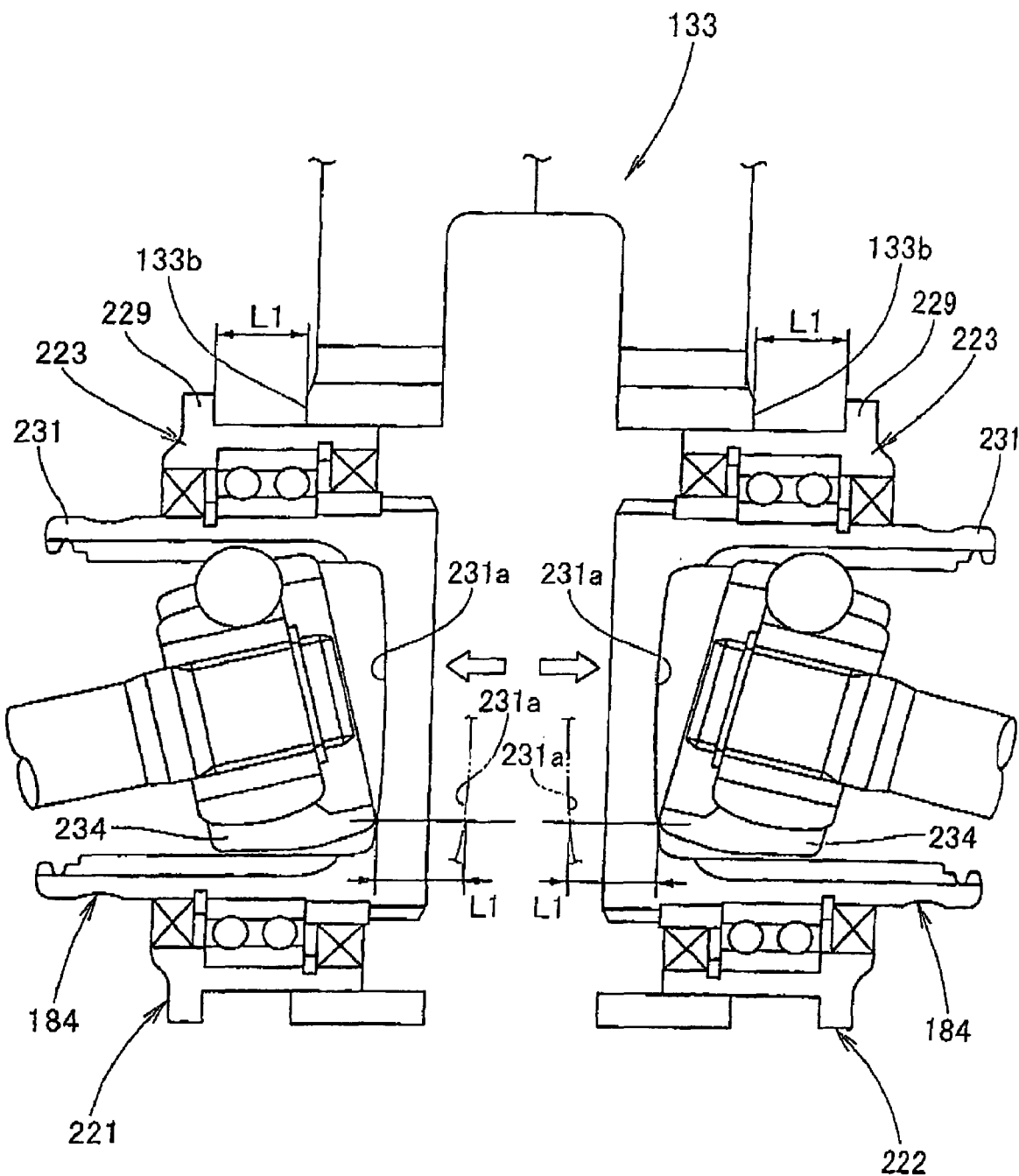
FIG. 13 is a first operation drawing showing the operation of attachment and detachment of a driven sprocket of the drive force transmitting unit according to the embodiment.
Figure 14:
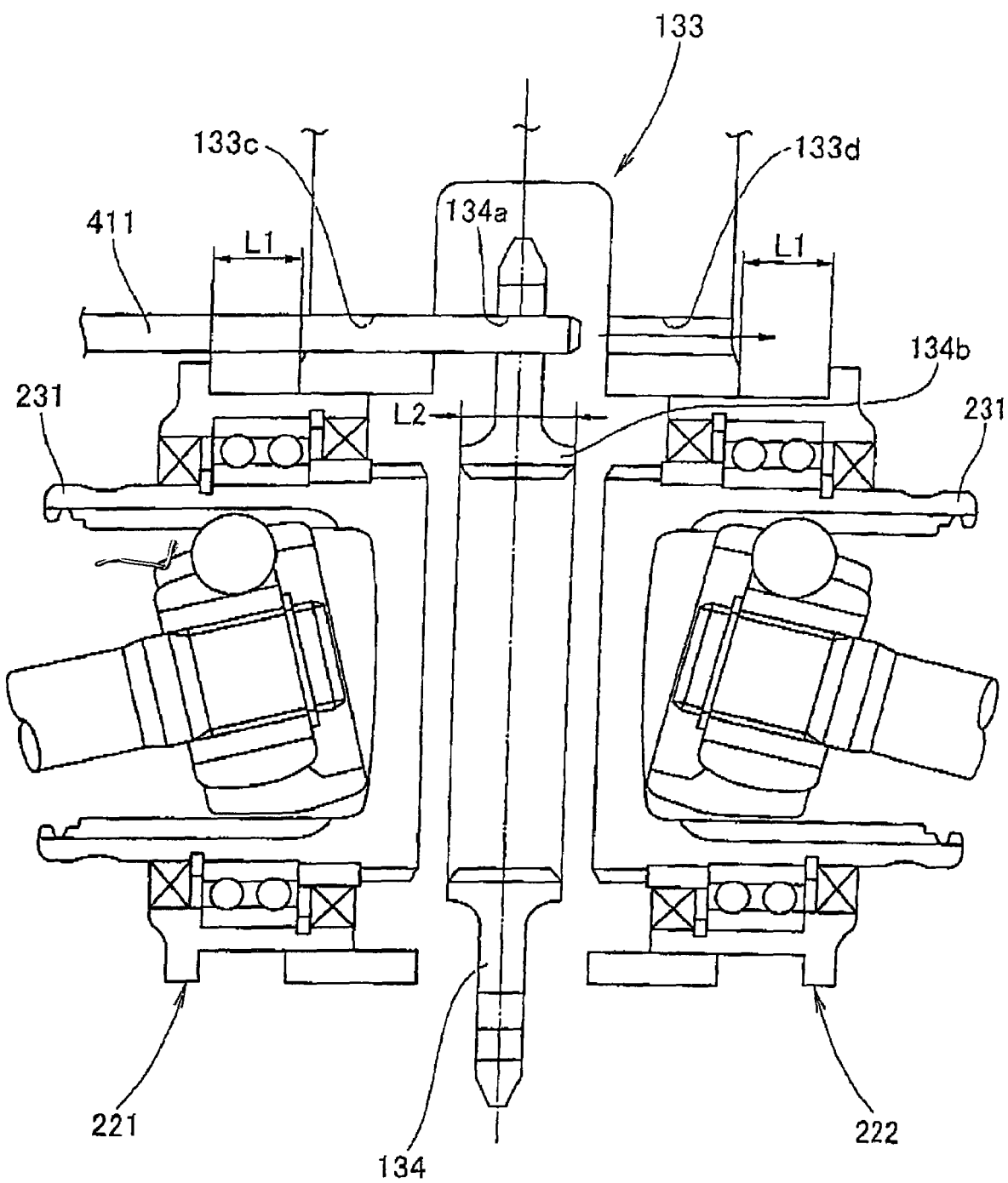
FIG. 14 is a second operation drawing showing the operation of attachment and detachment of the driven sprocket of the drive force transmitting unit according to the embodiment.

FIG. 13 is a first operation drawing showing the attaching and detaching operation of the driven sprocket of the drive force transmitting unit according to the embodiment, FIG. 14 is a second operation drawing showing the attaching and detaching operation of the driven sprocket of the drive force transmitting unit according to the embodiment. FIG. 15 is a third operation drawing showing the attaching and detaching operation of the driven sprocket of the drive force transmitting unit according to the embodiment.

In FIG. 13, the left and right housings 231 are moved together with the left and right cylindrical member 223 in the direction indicated by a hollow arrow with respect to the final gear case 133. When the amount of movement of the housings 231 at the moment when the bottom surface 231a of the housing 231 abuts against part of the constant velocity joint 184, that is, against the cage 234 is represented by L1, the distance between the side surface 133b of the final gear case 133 and the flange 229 of the cylindrical member 223 also becomes L1.

In FIG. 14, the driven sprocket 134 is disposed in a space between the left and right housings 231. Then, a sprocket retaining tool 411 is inserted into one of tool insertion holes 133c, which is formed on the final gear case 133, passed through a tool insertion elongated hole 134a formed on the driven sprocket 134, and then passed through the other tool insertion holes 133d formed on the final gear case 133 as shown by an arrow, so that the driven sprocket 134 is brought into a state of being retained by the final gear case 133. When the width of a base portion 134b of the driven sprocket 134 is represented by L2, L1 is set to be L1>(0.5×L2).

Figure 15:
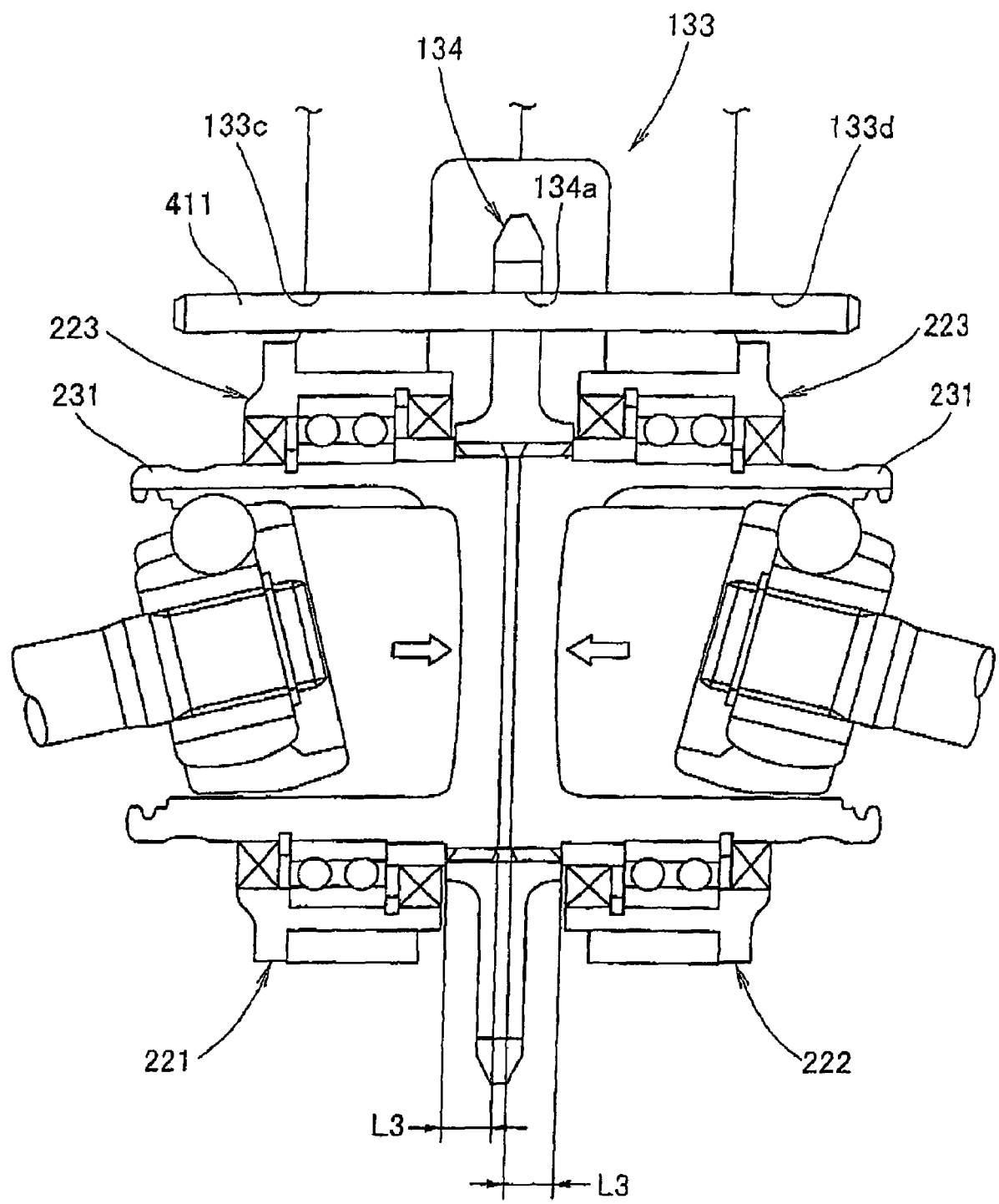
FIG. 15 is a third operation drawing showing the operation of attachment and detachment of the driven sprocket of the drive force transmitting unit according to the embodiment.

In FIG. 15, the left and right housings 231 and the cylindrical member 223 are moved to the center of the final gear case 133 as shown by a hollow arrow, the left and right cylindrical members 223 are mounted to the final gear case 133 with a mounting bolt, and the sprocket retaining tool 411 is pulled out from the tool insertion holes 133c, 133d of the final gear case 133 and the tool insertion elongated hole 134a of the driven sprocket 134. Then, assembly of the driven sprocket 134 is completed.

When an engaging margin of spline-fitting between the housing 231 and the driven sprocket 134 is represented by L3, the relation between the engaging margin L3 and the aforementioned amount of movement L1 is: L1>L3.

Removal of the driven sprocket 134 is achieved by removing the cylindrical member 223 by loosening the mounting bolt from the final gear case 133, and moving the left and right housings 231, 231 toward the sides.

For example, as shown in FIG. 10, when the driven sprocket 134 is disassembled from a state in which the chain 47 is wound around the driven sprocket 134, since the chain 47 is hung over the anti-roll bar body 121 of the anti-roll bar device 54, and hence does not drop off, reassembly of the driven sprocket 134 can be performed easily. In this manner, the anti-roll bar device 54 has a function for hanging the chain when the driven sprocket 134 is disassembled.

Adjustment of the play of the aforementioned chain 47 will be described below.

Figure 16A:
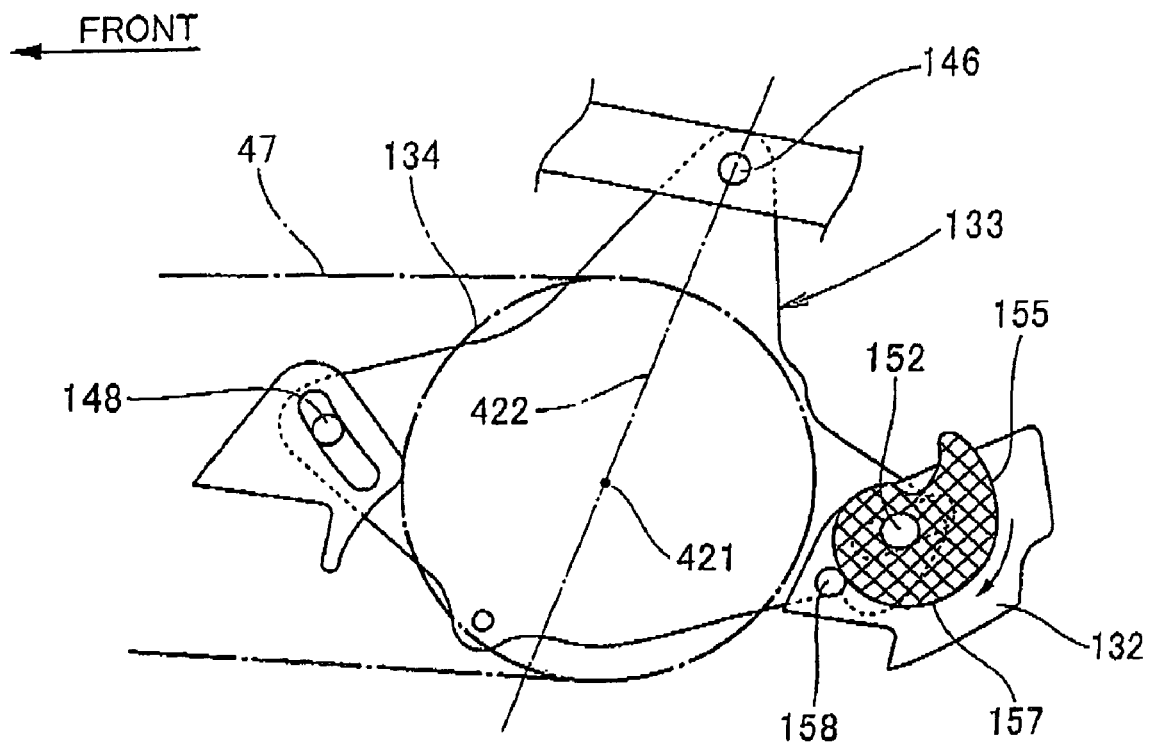
FIG. 16A is an operation drawing showing the operation of a chain play adjustment in a state before adjusting the play of the chain.
Figure 16B:
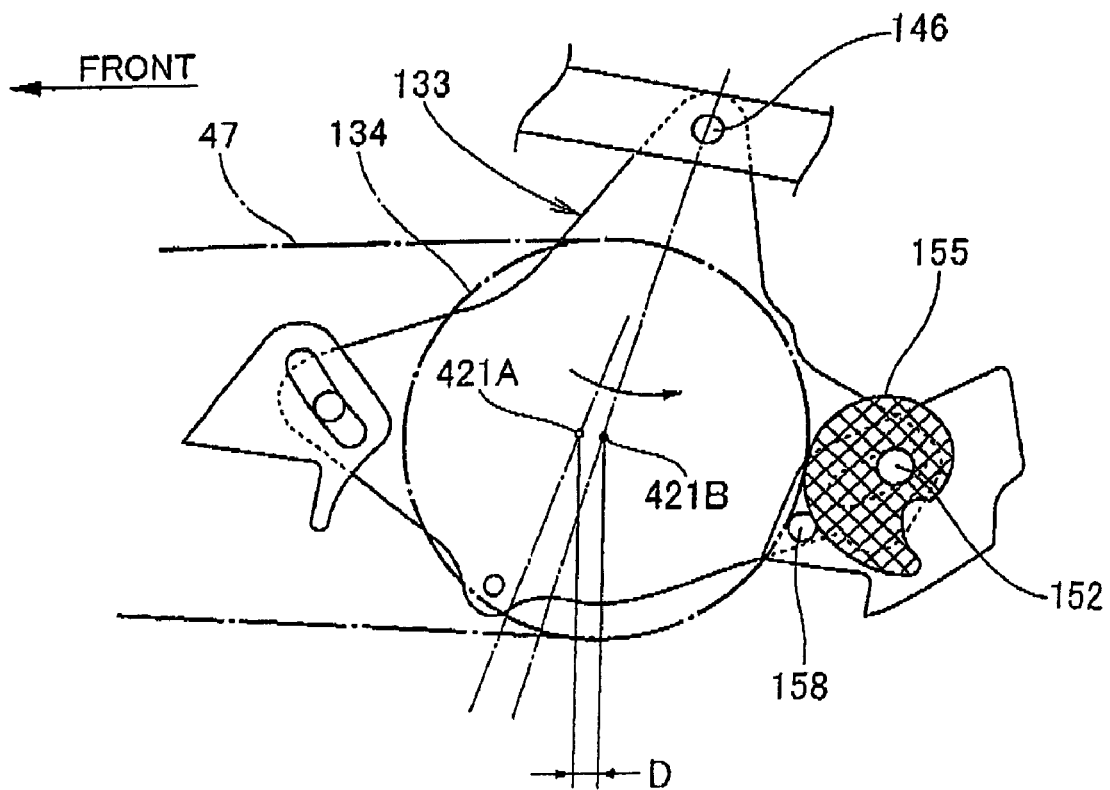
FIG. 16B is an operation drawing showing the operation of the chain play adjustment in a state after a snail cam is rotated.

FIGS. 16A and 16B are the operation drawing showing the operation of the chain play adjustment of the vehicle according to the embodiment.

FIG. 16A shows a state before adjusting the play of the chain 47, and shows the same state as in FIG. 2. The chain 47 and the driven sprocket 134 are represented by thick lines, and the snail cam 155 is provided with cross-hatching for clarifying the shape. Reference numeral 421 in the drawing designates a center point of the driven sprocket 134, reference numeral 422 designates a straight line passing through the center portion 421 and the axial center of the mounting bolt 146 which corresponds to the pivot shaft of the final gear case 133.

From this state, the mounting bolts 146, 148, 152 at the three positions are loosened first, and then, the snail cam 155 is rotated in the direction indicated by an arrow about the mounting bolt 152. Consequently, the distance from the mounting bolt 152 to the outer peripheral surface 157 of the snail cam 155 gradually increases, and the snail cam 155 moves rearward while pressing the pin 158 fixed to the case supporting is bracket 132.

FIG. 16B shows a state after having rotated the snail cam 155.

Since the snail cam 155 moves from the position shown in FIG. 16A rearwardly of the vehicle, the final gear case 133 pivots in the direction indicate by an arrow about the mounting bolt 146 via the mounting bolt 152, accordingly.

Consequently, the center point 421 of the driven sprocket 134 (here, the center point before movement is represented by 421A, and the center point after movement is represented by 421B) moves rearwardly of the vehicle by a distance D together with the final gear case 133. Accordingly, the play of the chain 47 can be adjusted, in other words, the play can be reduced.

When adjustment of the play of the chain 47 is completed, the mounting bolts 146, 148, 152 at three positions are tightened so that the final gear case 133 is fixed.

For example, in a system in which the play of the chain is adjusted by sliding the case side in the fore-and-aft direction of the vehicle, it is difficult to reduce the difference in amount of movement of the left and right ends of the case when the case side is slid, and hence it is required to employ a structure in which the left end and the right end of the case are moved little by little alternately, or the cam mechanisms for moving the left and right sides are rotated synchronously. However, since the present invention employs a system in which the final gear case 133 is pivoted about the mounting bolt 146 to adjust the play of the chain 47, the difference in amount of movement of the left and right ends of the final gear case 133 can be reduced (in other wards, the final gear case 133 can hardly be inclined in the lateral direction). Therefore, adjustment of the play of the chain can be adjusted easily, and the structure for adjusting the play of the chain can be simplified.

The chain play adjusting device of the present invention has a structure preferably for adjusting the play of the chain since it is configured in such a manner that by combining with the left and right independent suspensions, the final gear case 133, the driven sprocket 134, the bearing 176, and the part of the constant velocity joint 184 must simply be moved when adjusting the play of the chain, and hence it is not necessary to move the left and right rear wheels as in the case of the related art, whereby the operating force can be reduced.

Figure 17:
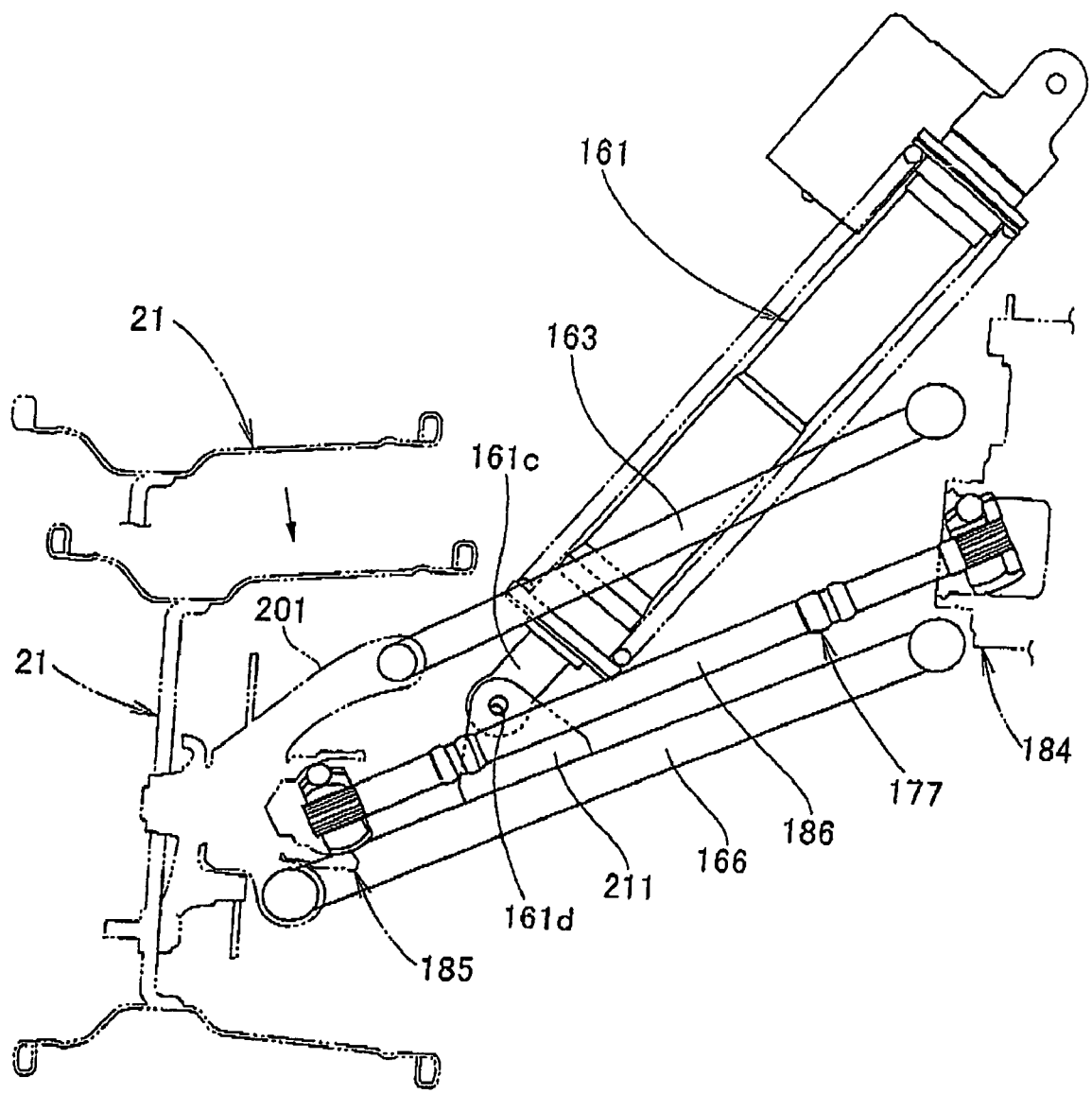
FIG. 17 is an operation drawing showing the operation of the cushion unit mounting structure in the vehicle according to the embodiment.

FIG. 17 is an operation drawing showing the operation of the cushion unit mounting structures for the vehicle according to the embodiment.

For example, when the rough-terrain traveling vehicle 10 (see FIG. 1) is jacked up and lifted for maintenance, and the front wheels 12, 13 (see FIG. 1. Reference numeral 13 is not shown) and the rear wheels 21, 22 (only one of the reference numerals 21 is shown) are moved away from the ground, the rear cushion units 161 are expanded to the maximum by the self weight of the rear wheels 21, 22, the upper arms 163, 164 (only one of the reference numeral 163 is shown), the lower arms 166, 167 (only one of the reference numeral 166 is shown). In other words, the pistons in the cylinders of the rear cushion units 161 come into abutment with the ends of the cylinders.

At this time, the mounting portions 161c of the rear cushion units 161 with respect to the cushion mounting bracket 211, more specifically, the mounting holes 161d are located at positions that do not overlap with the shafts 186 of the drive shafts 177 when viewed from the front side, or from the rear side of the vehicle.

Therefore, the cushion mounting bolts 267 (see FIG. 7) can be inserted easily into the mounting holes 161d and the mounting holes (not shown) of the cushion mounting brackets 211, 211 from the front side of the vehicle.

As described in conjunction with FIG. 1, FIG. 3, FIG. 4 and FIG. 7 above, in the rough-terrain traveling vehicle 10 as a vehicle in which the rear wheels 21, 22 as the left and right wheels are independently suspended via the lower arms 166, 167 as the left and right arm members respectively, the anti-roll bar device 54 as a connecting member is extended between the left and right lower arms 166, 167, the left and right rear wheels 21, 22 are driven from the engine 16 side via the chain 47, and the anti-roll bar device 54 is disposed so as to extend across the inside of the circle of the chain 47.

Since the anti-roll bar device 54 is disposed so as to extend across the inside of the circle of the chain 47, the anti-roll bar device 54 can be placed in the vicinity of the chain 47. Therefore, interference with the chain 47 can be avoided, and the length of the anti-roll bar device 54 can be reduced, whereby the weight of the anti-roll bar device 54 can be reduced.

Further, the anti-roll bar device 54 is mounted to the lower surfaces of the lower arms 166, 167.

By mounting the anti-roll bar device 54 on the lower surfaces of the lower arms 166, 167, when the left and right rear wheels 21, 22 are driven by the drive shafts 177, 178 (only one of the reference numerals 177 is shown), the anti-roll bar device 54 can be attached to and detached from the lower arms 166, 167 easily without being affected by the drive shafts 177, 178 located above the lower arms 166, 167, whereby operability can be improved.

Further, the anti-roll bar device 54 is connected to the lower arms 166, 167 via the link mechanisms 122.

By connecting the anti-roll bar device 54 to the lower arms 166, 167 via the link mechanisms 122, flexibility of arrangement of the anti-roll bar device 54 can be increased by changing the length of the link mechanisms 122, whereby the anti-roll bar device 54 can be disposed at a further suitable position.

Further, the lower arms 166, 167 are respectively composed of the lower first arm 261 and the lower second arm 262 as the two arm members arranged laterally in front and rear with respect to the vehicle body, the link mechanisms 122 are extended downwardly from the positions above and between the respective pairs of the lower first arm 261 and lower second arm 262, and the distal ends thereof are connected to the lower surfaces of the lower second arms 262.

By disposing the link mechanisms 122 so as to extend downwardly from the positions above and between the respective pairs of the lower first arm 261 and lower second arm 262, unused spaces between the respective pairs of the lower first arm 261 and lower second arm 262 can be effectively used, whereby the downsized compact rough-terrain traveling vehicle 10 is obtained.

Further, the lower ends of the rear cushion units 161, 161 for absorbing impact applied to the left and right rear wheels 21, 22 and preventing the impact from being transmitted to the vehicle body side are mounted to the lower arms 166, 167.

By mounting the lower ends of the rear cushion units 161, 161 to the lower arms 166, 167, the impact applied to the left and right rear wheels 21, 22 can be absorbed by the rear cushion units 161, 161 via the lower arms 166, 167.

Further, the rear cushion units 161 are mounted to the upper surfaces 263a of cross plates 263 that connect the respective pairs of the lower first arm 261 and lower second arm 262 of the lower arms 166, 167 at the positions in the vicinity of the joint portions between the cross plates 263 and one of the lower second arms 262.

By mounting the rear cushion units 161 on the upper surfaces 263a of the cross plates 263 that connect the respective pairs of the lower first arm 261 and lower second arm 262 of the lower arms 166, 167 at the positions in the vicinity of the joint portions between the cross plates 263 and one of the lower second arms 262, the rear cushion units 161 can be mounted to the positions where strength and rigidity is significantly high, whereby the rear cushion units 161 can be stably supported.

As described in conjunction with FIG. 1, FIG. 2 and FIG. 5 above, in a chain play adjusting device 159 including the final gear case 133 movably mounted on the side of the vehicle body, the final gear case 133 supporting a rear drive shaft 244 as a rear drive mechanism, and the driven sprocket 134 mounted to the rear drive shaft 244, thereby adjusting the play of the chain 47 extending between the engine 16 side, more specifically, the drive sprocket 46 and the driven sprocket 134, the final gear case 133 is retained so as to be pivotable about the mounting bolt 146 as the pivot shaft with respect to the vehicle body, and the rotating cam mechanism 160, that is, the snail cum 155 and the pin 158 are provided on another mounting portions of the final gear case 133 with respect to the vehicle body, that is, the mounting bolt 152 side.

Since the final gear case 133 is pivotably retained on the vehicle body and the rotating cam mechanism 160 for adjusting the amount of pivotal movement of the final gear case 133 is provided, the mounting bolt 146 as the pivot shaft of the final gear case 133 does not move in the fore-and-aft direction, and hence the load in the fore-and-aft direction of the vehicle can be supported reliably with the mounting bolt 146, whereby supporting rigidity of the final gear case 133 can further be improved. Also, by changing the distance from the mounting bolt 146 to the rotating cam mechanism 160, more specifically, from the mounting bolt 146 to the contact point between the snail cam 155 and the pin 158, the operating force for adjusting the play of the chain can be reduced, whereby the chain play adjusting device 159 suitable for the machine type can be provided.

Further, the rear drive shaft 244 is constituted of the part of the left and right constant velocity joints 184 provided at the ends of a pair of the drive shafts 177, 178 for transmitting the drive force to the rear wheels 21, 22 as the left and right wheels, more specifically, of the left and right housings 231, 231, and in that the driven sprocket 134 and the housings 231, 231 driven by the driven sprocket 134 are accommodated in the final gear case 133 so as to be attachable and detachable, respectively.

Since the driven sprocket 134 and the housings 231, 231 are accommodated in the final gear case 133 so as to be attachable and detachable, respectively, the structure of the drive force transmitting unit can be simplified, and hence the final gear case 133 can be downsized, thereby reducing the weight. Therefore, the final gear case 133 and the driven sprocket 134 can be moved by the smaller operating force when adjusting the play of the chain 47, and hence adjustment of the play of the chain can be performed easily.

Further, the mounting volt 146 as the pivot shaft is provided at the upper position of the final gear case 133, another mounting portions of the final gear case 133, that is, the mounting bolts 148, 152 sides are provided at two positions at the front and the rear of the final gear case 133, and the arcuate elongated holes 147, 151 as the pivotal movement allowing structure are provided on the vehicle body side corresponding to the mounting portions at these two positions.

Since the final gear case 133 is retained by the vehicle body at three positions, and the mounting bolt 146 as the pivot shaft is provided at the uppermost position, the final gear case 133 can be retained further stably. In addition, when the chain 47 is wound in the fore-and-aft direction, the play of the chain 47 can be adjusted effectively.

Further, the lower frames 76, 77 as the under frames for supporting the lower side of the final gear case 133 are provided below the final gear case 133, rear perpendicular frames 86, 87 as the rear frames extending in the vertical direction are provided rearwardly of the final gear case 133, the lower frames 76, 77 and the rear perpendicular frames 86, 87 are joined behind the final gear case 133, the case supporting brackets 132 as brackets are attached to the joint portions astride the lower frames 76, 77 and the rear perpendicular frames 86, 87, and the rotating cam mechanisms 160 are provided on the case supporting brackets 132.

Since the case supporting brackets 132 are provided at the joint portions between the lower frames 76, 77 and the rear perpendicular frames 86, 87, and the rotating cam mechanisms 160 are provided on the case supporting brackets 132, more specifically, the snail cams 155 are rotatably attached to the case supporting brackets 132 via the mounting bolts 152 and the pins 158 are attached to the case supporting brackets 132, the final gear case 133 to which the drive force is exerted can be supported by the portions having high strength and rigidity, whereby the final gear case 133 can be supported stably.

As described in conjunction with FIG. 4 above, in the rough-terrain traveling vehicle 10 as a vehicle (see FIG. 1) in which lower ends of the rear cushion units 161 are attached to the lower arms 166, 167 of a pair of the upper arms 163, 164 (only one of the reference numerals 163 is shown) and the lower arms 166, 167 (only one of the reference numerals 166 is shown) provided on the double wishbone type independent suspension for suspending the rear wheels 21, 22 (only one of the reference numerals 21 is shown) as left and right wheels independently via the cushion mounting brackets 211, 211 as brackets and the left and right wheels 21, 22 are driven by the drive shafts 177, 178 (only one of the reference numerals 177 is shown), the mounting portions 161c, more specifically, the mounting holes 161d, at the lower ends of the rear cushion units 161 with respect to the lower arms 166, 167 are provided at positions that does not overlap with the drive shafts 177, 178, more specifically, the shafts 186 when viewed from the front side, or from the rear side of the rough-terrain traveling vehicle 10 when the rear cushion units 161 are expanded to a maximum extent.

Since the mounting portions 161c of the rear cushion units 161 are located at positions not overlapping with the drive shafts 177, 178 when viewed from the front side, or from the rear side of the rough-terrain traveling vehicle 10, the mounting direction of the rear cushion units 161 with respect to the lower arms 166, 167 is not easily subjected to restraints and hence assembleability and maintenanceability of the rear cushion units 161 can be enhanced.

Further, the mounting portions 161c, more specifically, the mounting holes 161d, at the lower ends of the cushion units 161 with respect to the lower arms 166, 167 are positioned between the upper arms 163, 164 and the drive shafts 177, 178, more specifically, the shafts 186, when viewed from the front side, or from the rear side of the rough-terrain traveling vehicle 10 when the cushion units 161 are expanded to a maximum extent.

Since the mounting portions 161c of the cushion units 161 are positioned between the upper arm 163 and the drive shaft 177, and between the upper arm 164 and the drive shaft 178 when viewed from the front side, or from the rear side of the rough-terrain traveling vehicle 10, when the cushion units 161 are replaced from between the upper arm 163 and the drive shaft 177, and between the upper arm 164 and the drive shaft 178, the mounting bolts and nuts, for example, can be inserted easily, whereby good maintenanceability is achieved.

Further, the mounting portions 161a, more specifically, the mounting holes 161b, of the rear cushion units 161 with respect to the vehicle body frame 11 (see. FIG. 1) is disposed at positions closer to the widthwise center, that is, the vertical line 202 of the vehicle body 11 than the mounting portions 163a, 164a (only one of the reference numerals 163a is shown) and the mounting portions 166a, 167a (only one of the reference numerals 166a is shown) of the upper arms 163, 164 and the lower arms 166, 167 to be mounted to the vehicle body frame 11, and the rear cushion units 161 is integrated with the reserve tank 171.

Since the mounting portions 161a of the rear cushion units 161 with respect to the vehicle body frame 11 are disposed at positions closer to the widthwise center of the vehicle body 11 than the mounting portions 163a, 164a, 166a, 167a of the upper arms 163, 164 and the lower arms 166, 167 to be mounted to the vehicle body frame 11, the stroke of the rear cushion units 161 can be increased, whereby drivability of the rough-terrain traveling vehicle 10 can be enhanced.

As described in conjunction with FIG. 4 and FIG. 7, the mounting portions 161c of the rear cushion units 161 with respect to the lower arms 166, 167 are mounted by inserting mounting bolts 267 from the front and tightening nuts 268 at the rear ends of the mounting bolts 267 with a tool.

Since the mounting portions 161c of the rear cushion units 161 are mounted by inserting the mounting bolts 267 from the front and tightening the nuts 268 at the rear ends of the mounting bolts 267 with a tool, the amount of the mounting bolts 267 projecting forward from the mounting portions 161c of the rear cushion units 161 can further be reduced.

As described in conjunction with FIG. 17, the mounting portions 161c of the rear cushion units 161, more specifically, the mounting holes 161d are located at positions overlapping with the drive shafts 177, 178 (only one of the reference numerals 178 is shown), more specifically, with the shafts 186 when viewed from the front side, or from the rear side of the rough-terrain traveling vehicle 10 in a state of empty in which no load is placed and no occupant exists in the rough-terrain traveling vehicle 10 (see FIG. 1).

Since the mounting portions 161c of the rear cushion units 161 are located at positions interposing with the drive shafts 177, 178 when viewed from the front side or from the rear side of the rough-terrain traveling vehicle 10 when the vehicle is empty, the ill-intentioned mischief such as disconnecting the lower ends of the rear cushion units 161 can be prevented, whereby crime-prevention property can be enhanced.

The anti-roll bar device according to the embodiment is suitable for vehicles especially vehicles having the independent left and right wheels.

Moreover, the chain play adjusting device according to the embodiment is suitable for vehicles especially vehicles having the independent left and right wheels.

Moreover, the arrangement structure of cushion unit in a vehicle according to the embodiment is suitable for vehicles having the independent left and right wheels.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. A vehicle comprising:
a right wheel and a left wheel;
a right arm member and a left arm member for independently suspending the right wheel and the left wheel respectively;
a connecting member extending from the right arm member to the left arm member; and
a chain, wherein the right wheel and the left wheel are driven by an engine through the chain, and the connecting member extends through the inside of a chain circle.

2. The vehicle according to claim 1, wherein the right arm member and the left arm member respectively including upper arms and lower arms, and the connecting member is mounted to lower surfaces of the lower arms.

3. The vehicle according to claim 1, wherein the right arm member and the left arm member respectively including upper arms and lower arms, and the connecting member is connected to the lower arms via link mechanisms.

4. The vehicle according to claim 3, wherein the lower arms respectively comprise first arm members and second arm members, the link mechanisms downwardly extend between the first arm members and the second arm members respectively, and ends of the link mechanisms are respectively connected to lower surfaces of ones of the first arm members and the second arm members.

5. The vehicle according to claim 3, further comprising cushion units for absorbing impact applied to the right wheel and the left wheel so as to prevent the impact from being transmitted to the vehicle body side,
wherein lower ends of the cushion units are respectively connected to the lower arms.

6. The vehicle according to claim 5, further comprising cross plates respectively connecting the first arm members and the second arm members,
wherein the cushion units are respectively mounted to upper surfaces of the cross plates at positions in vicinity of joint portions between the cross plates and ones of the first arm members and the second arm members.

7. A vehicle comprising:
an independent suspension that independently suspends left and right wheels via knuckles, the independent suspension includes upper arms and lower arms connected to the corresponding knuckles, the lower arms being connected to the corresponding knuckles independent of the upper arms;

cushion units having mounting portions located at lower ends thereof, the mounting portions are respectively attached to the lower arms through brackets; and drive shafts that respectively drive the left and right wheels, wherein the mounting portions are disposed at positions that do not overlap with the drive shafts when viewed from a front side or a rear side of the vehicle when the cushion units are expanded to maximum extents and the mounting portions are located between the drive shafts and the upper arms, wherein mounting portions of the cushions to the vehicle body are disposed at positions closer to a widthwise center of the vehicle body than positions where the upper arms and the lower arms are mounted on the vehicle body, and wherein the cushion units are integrated with reserve tanks.

8. The vehicle according to claim 7, wherein the mounting portions are positioned between the upper arms and the drive shafts when viewed from the front or rear of the vehicle when the cushion units are expanded to maximum extents.

9. The vehicle according to claim 7, wherein the mounting portions are mounted by inserting bolts from front sides and tightening nuts at rear ends of the bolts with a tool.

10. A vehicle comprising:
an independent suspension that independently suspends left and right wheels and includes upper arms and lower arms;
cushion units having mounting portions located at lower ends thereof, the mounting portions are respectively attached to the lower arms through brackets; and
drive shafts that respectively drive the left and right wheels,
wherein the mounting portions are disposed at positions overlapping with the drive shafts when viewed from a front side or a rear side of the vehicle in an empty state in which no load is placed on the vehicle and no occupant exists on the vehicle,
the mounting portions are disposed at positions that do not overlap with the drive shafts when viewed from a front side or a rear side of the vehicle when the cushion units are expanded to maximum extents,
mounting portions of the cushions to the vehicle body are disposed at positions closer to a widthwise center of the vehicle body than positions where the upper alms and the lower arms are mounted on the vehicle body, and
the cushion units are integrated with reserve tanks.

11. The vehicle according to claim 10, wherein the mounting portions are located between the drive shafts and the upper arms.

12. The vehicle according to claim 7, wherein each bracket is fixed with respect to the corresponding lower arm.

13. The vehicle according to claim 10, wherein each bracket is fixed with respect to the corresponding lower arm.

14. A vehicle comprising:
an independent suspension that independently suspends left and right wheels via knuckles, the independent suspension includes upper arms and lower arms connected to the corresponding knuckles, the left and right wheels having wheel axles;
cushion units having mounting portions located at lower ends thereof, the mounting portions are respectively attached to the lower arms through brackets; and
drive shafts that respectively drive the left and right wheels,
wherein the mounting portions are disposed at positions that do not overlap with the drive shafts when viewed from a front side or a rear side of the vehicle when the cushion units are expanded to maximum extents and the mounting portions are located between the drive shafts and the upper arms,
mounting portions of the cushions to the vehicle body, are disposed at positions closer to a widthwise center of the vehicle body than positions where the upper arms and the lower arms are mounted on the vehicle body, and
the cushion units are integrated with reserve tanks,
the lower arms are connected to the corresponding knuckles at a position lower than the axles of the left and right wheels, and
the upper arms are connected to the corresponding knuckles at a position higher than the axles of the right and left wheels.

15. The vehicle according to claim 14, wherein the mounting portions are positioned between the upper arms and the drive shafts when viewed from the front or rear of the vehicle when the cushion units are expanded to maximum extents.

16. The vehicle according to claim 14, wherein the mounting portions are mounted by inserting bolts from front sides and tightening nuts at rear ends of the bolts with a tool.

* * * * *